Feb. 22, 1944.  G. C. CHASE  2,342,529
CALCULATING MACHINE
Filed April 29, 1941   15 Sheets-Sheet 3

STEPS OF PART PRODUCT DISCS

MULTIPLIER

| | +1- | | +2- | | +3- | | +4- | | +5- | | +6- | | +7- | | +8- | | +9- | |
|---|---|---|---|---|---|---|---|---|---|---|---|---|---|---|---|---|---|---|
| | T | U | T | U | T | U | T | U | T | U | T | U | T | U | T | U | T | U |
| 0 | 0 | 0 | 0 | 0 | 0 | 0 | 0 | 0 | 0 | 0 | 0 | 0 | 0 | 0 | 0 | 0 | 0 | 0 |
| 1 | 1 | 9 | 1 | 8 | 1 | 7 | 1 | 6 | 1 | 5 | 1 | 4 | 1 | 3 | 1 | 2 | 1 | 1 |
| 2 | 1 | 8 | 1 | 6 | 1 | 4 | 1 | 2 | 1 | 0 | 2 | 8 | 2 | 6 | 2 | 4 | 2 | 2 |
| 3 | 1 | 7 | 1 | 4 | 1 | 1 | 2 | 8 | 2 | 5 | 2 | 2 | 3 | 9 | 3 | 6 | 3 | 3 |
| 4 | 1 | 6 | 1 | 2 | 2 | 8 | 2 | 4 | 2 | 0 | 3 | 6 | 3 | 2 | 4 | 8 | 4 | 4 |
| 5 | 1 | 5 | 1 | 0 | 2 | 5 | 2 | 0 | 3 | 5 | 3 | 0 | 4 | 5 | 4 | 0 | 5 | 5 |
| 6 | 1 | 4 | 2 | 8 | 2 | 2 | 3 | 6 | 3 | 0 | 4 | 4 | 5 | 8 | 5 | 2 | 6 | 6 |
| 7 | 1 | 3 | 2 | 6 | 3 | 9 | 3 | 2 | 4 | 5 | 5 | 8 | 5 | 1 | 6 | 4 | 7 | 7 |
| 8 | 1 | 2 | 2 | 4 | 3 | 6 | 4 | 8 | 4 | 0 | 5 | 2 | 6 | 4 | 7 | 6 | 8 | 8 |
| 9 | 1 | 1 | 2 | 2 | 3 | 3 | 4 | 4 | 5 | 5 | 6 | 6 | 7 | 7 | 8 | 8 | 9 | 9 |

MULTIPLICAND (rows 0–9)

INVENTOR
George C. Chase
BY Strart Wilder
ATTORNEY

Witness- Elma W. Edwards

Feb. 22, 1944.　　　G. C. CHASE　　　2,342,529
CALCULATING MACHINE
Filed April 29, 1941　　　15 Sheets-Sheet 4

Witness
Elmer W. Edwards

INVENTOR
George C. Chase
BY
Stuart Hilde
ATTORNEY

Feb. 22, 1944. G. C. CHASE 2,342,529
CALCULATING MACHINE
Filed April 29, 1941 15 Sheets-Sheet 5
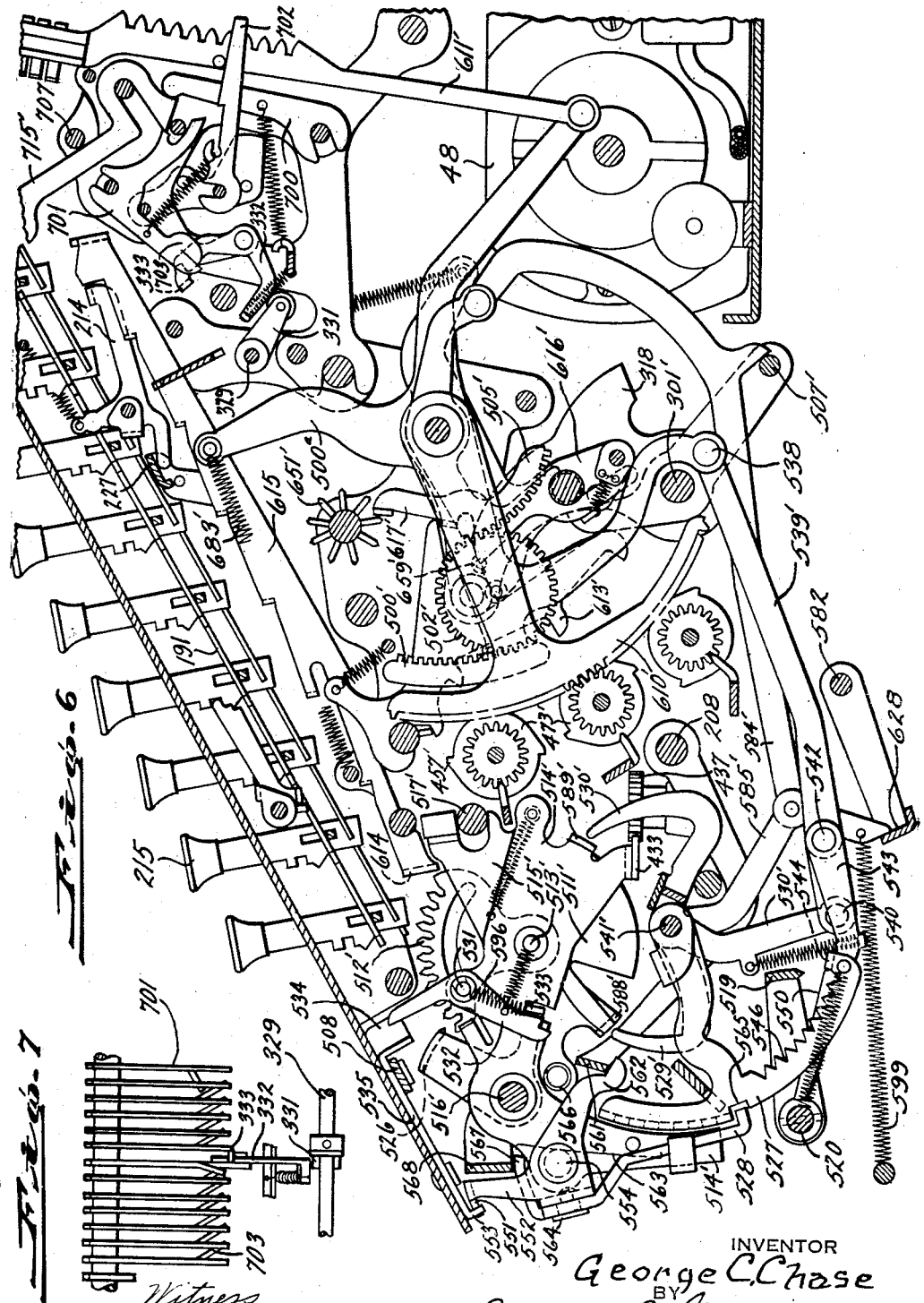
INVENTOR
George C. Chase
BY
ATTORNEY

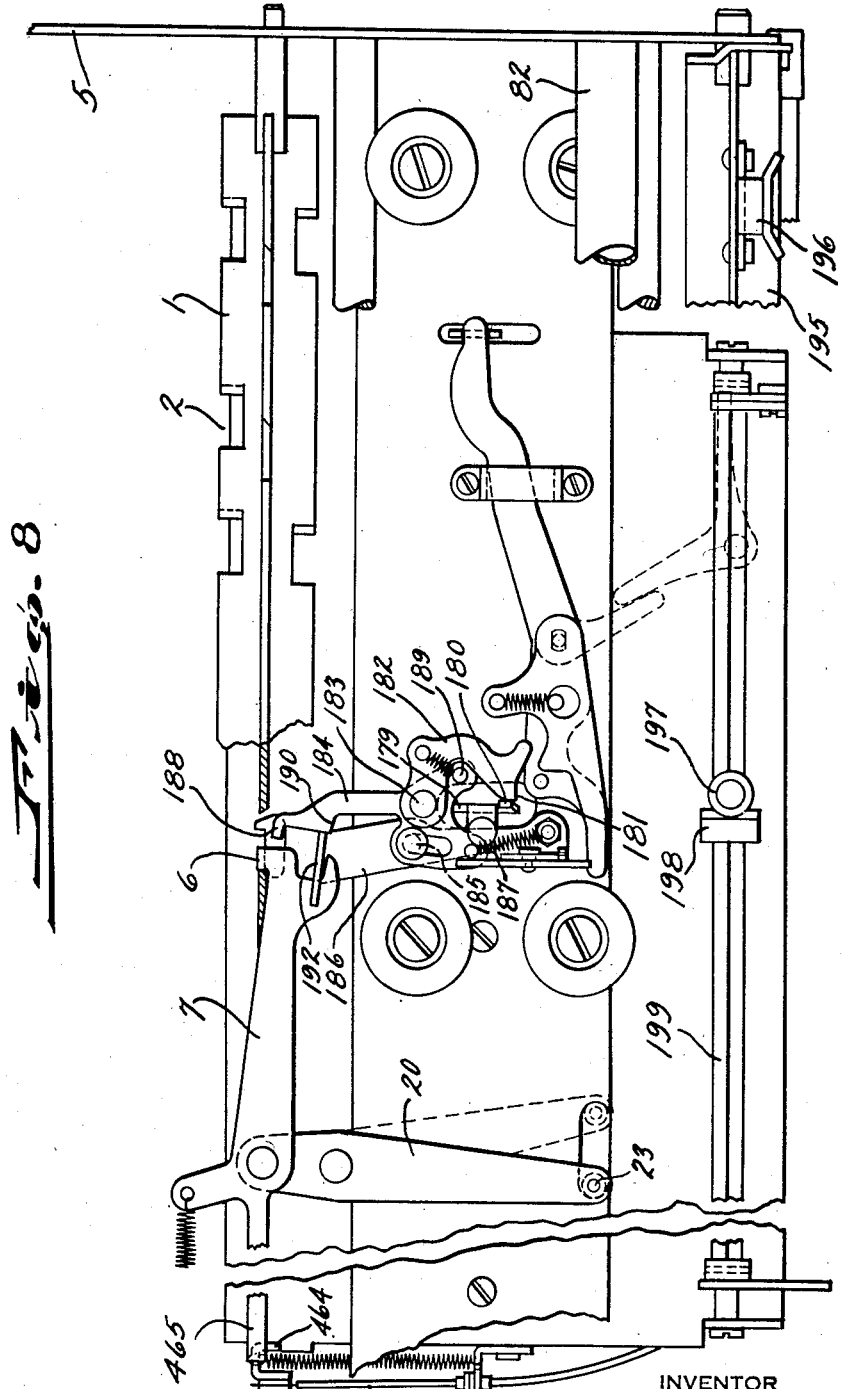

Feb. 22, 1944. G. C. CHASE 2,342,529
CALCULATING MACHINE
Filed April 29, 1941 15 Sheets-Sheet 7
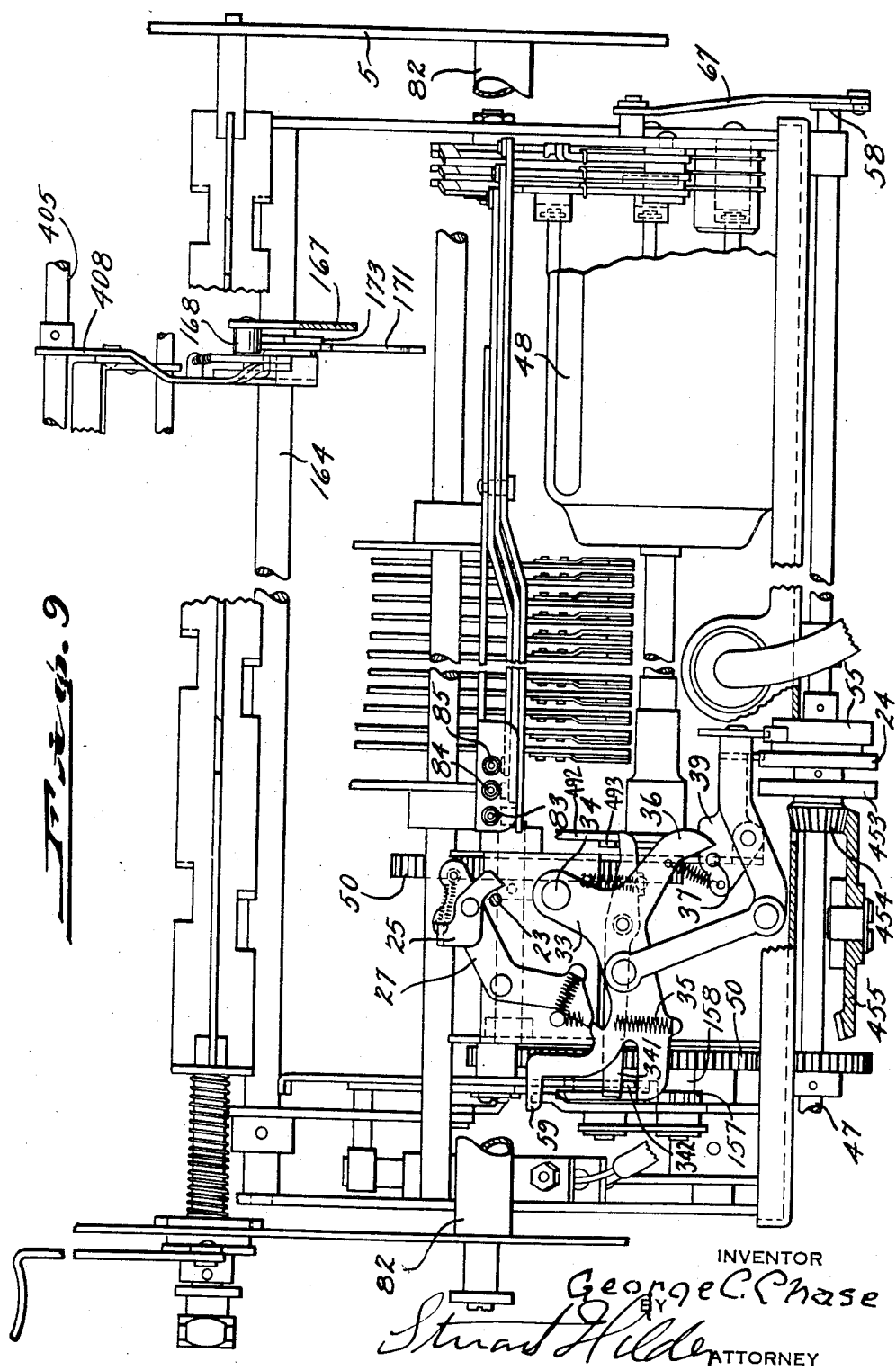
INVENTOR
George C. Chase
BY
Stuart Hilde
ATTORNEY

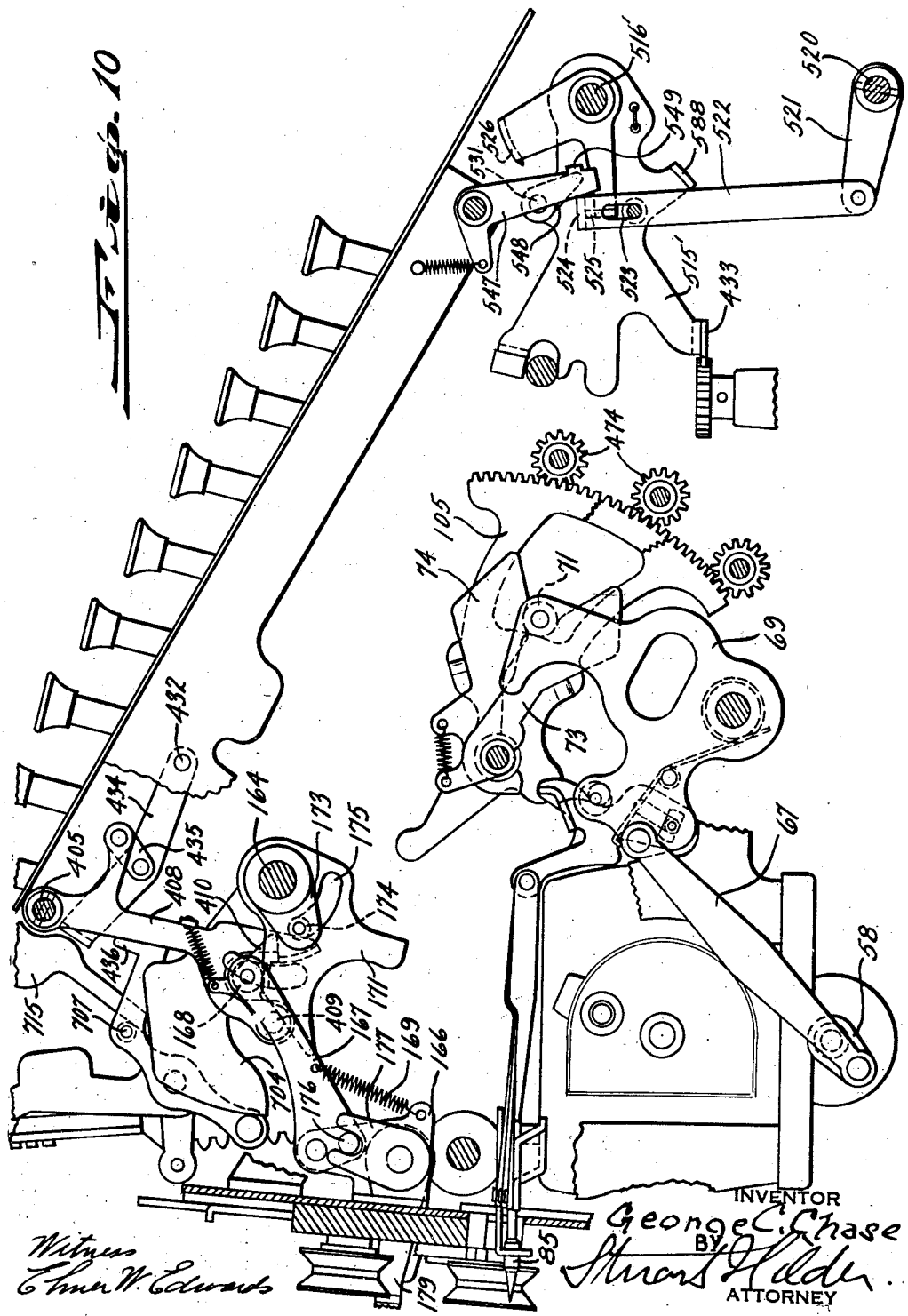

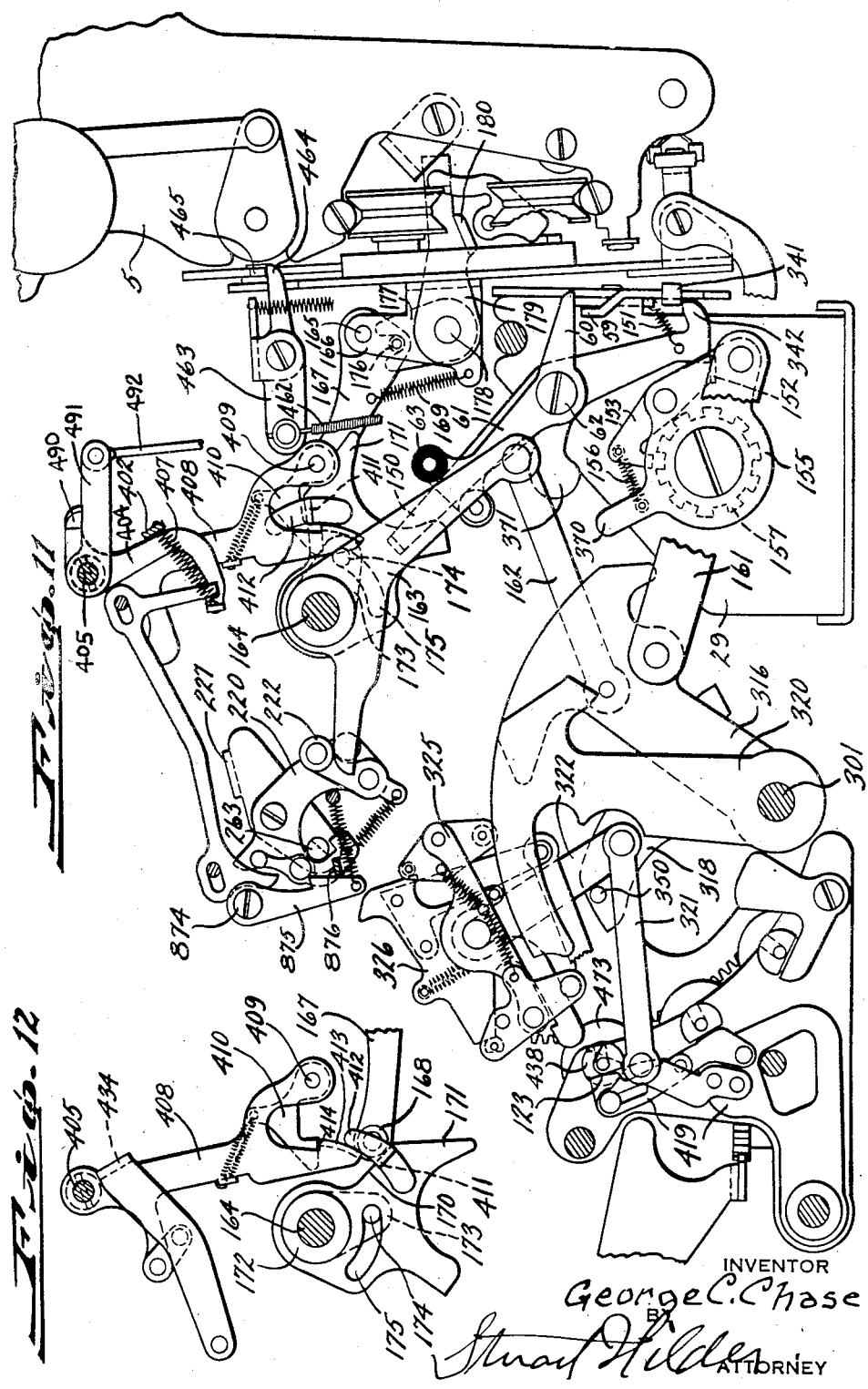

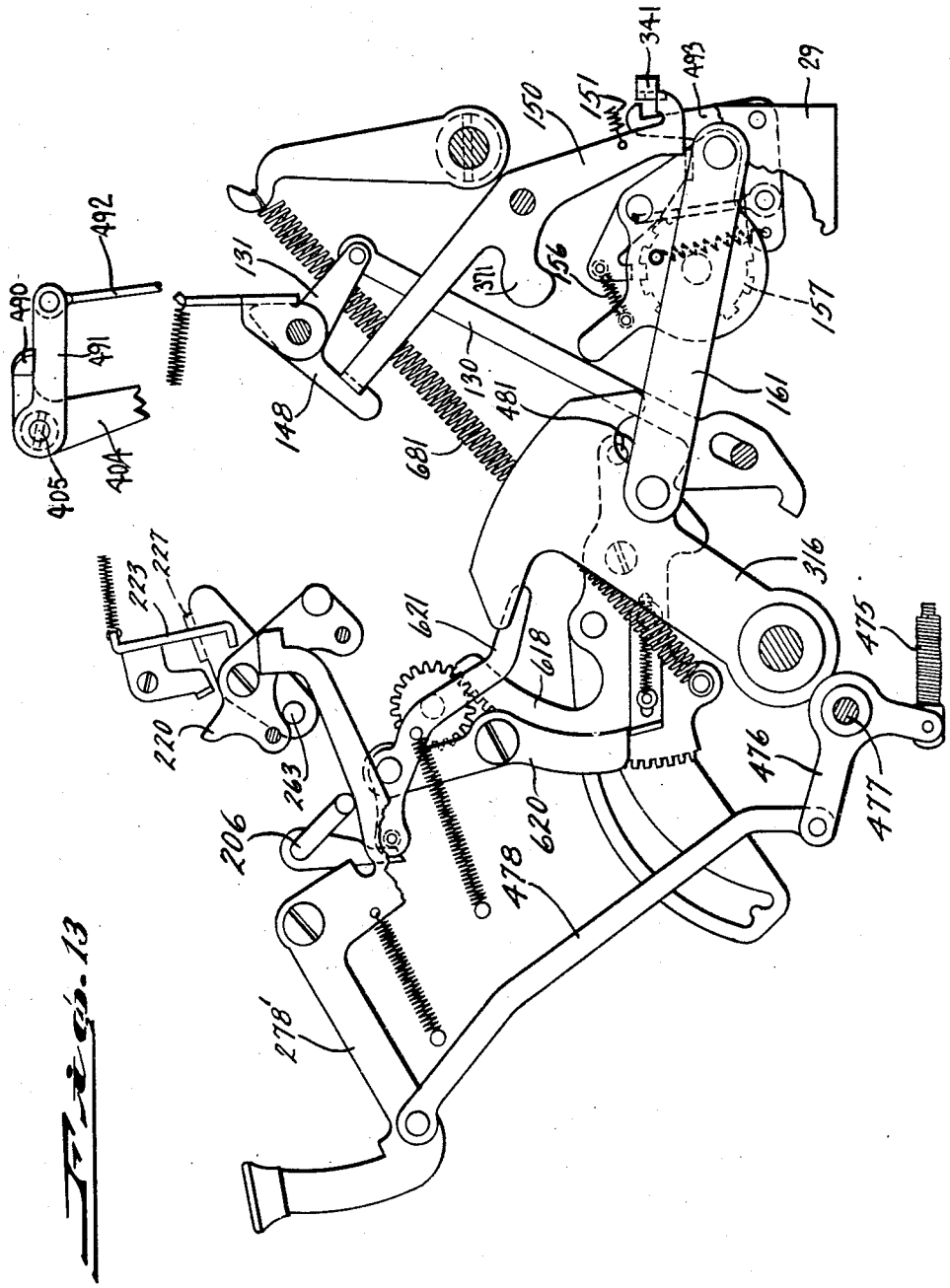

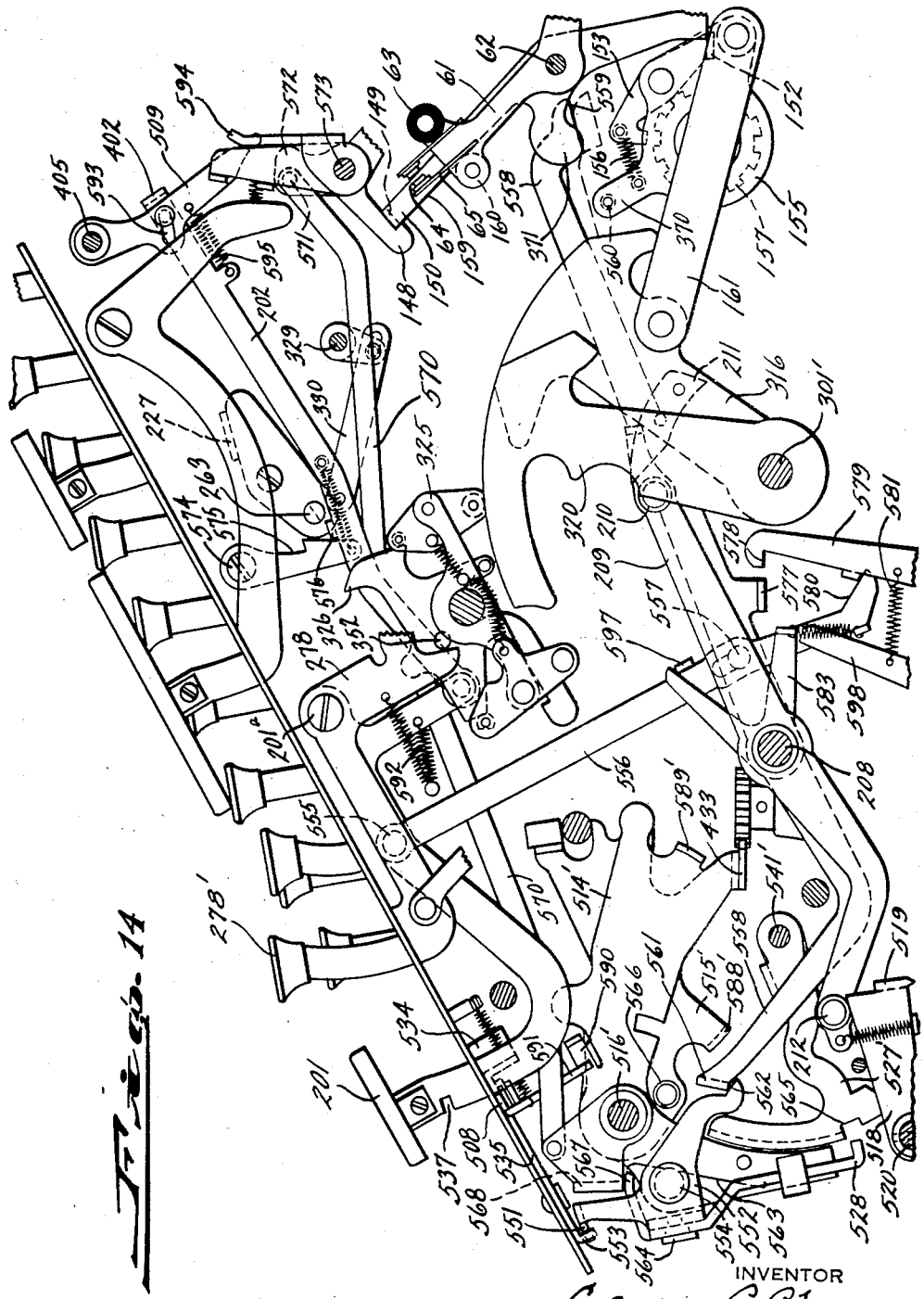

Feb. 22, 1944.  G. C. CHASE  2,342,529
CALCULATING MACHINE
Filed April 29, 1941  15 Sheets-Sheet 12

INVENTOR
George C. Chase
BY
ATTORNEY

Feb. 22, 1944.  G. C. CHASE  2,342,529
CALCULATING MACHINE
Filed April 29, 1941   15 Sheets-Sheet 13
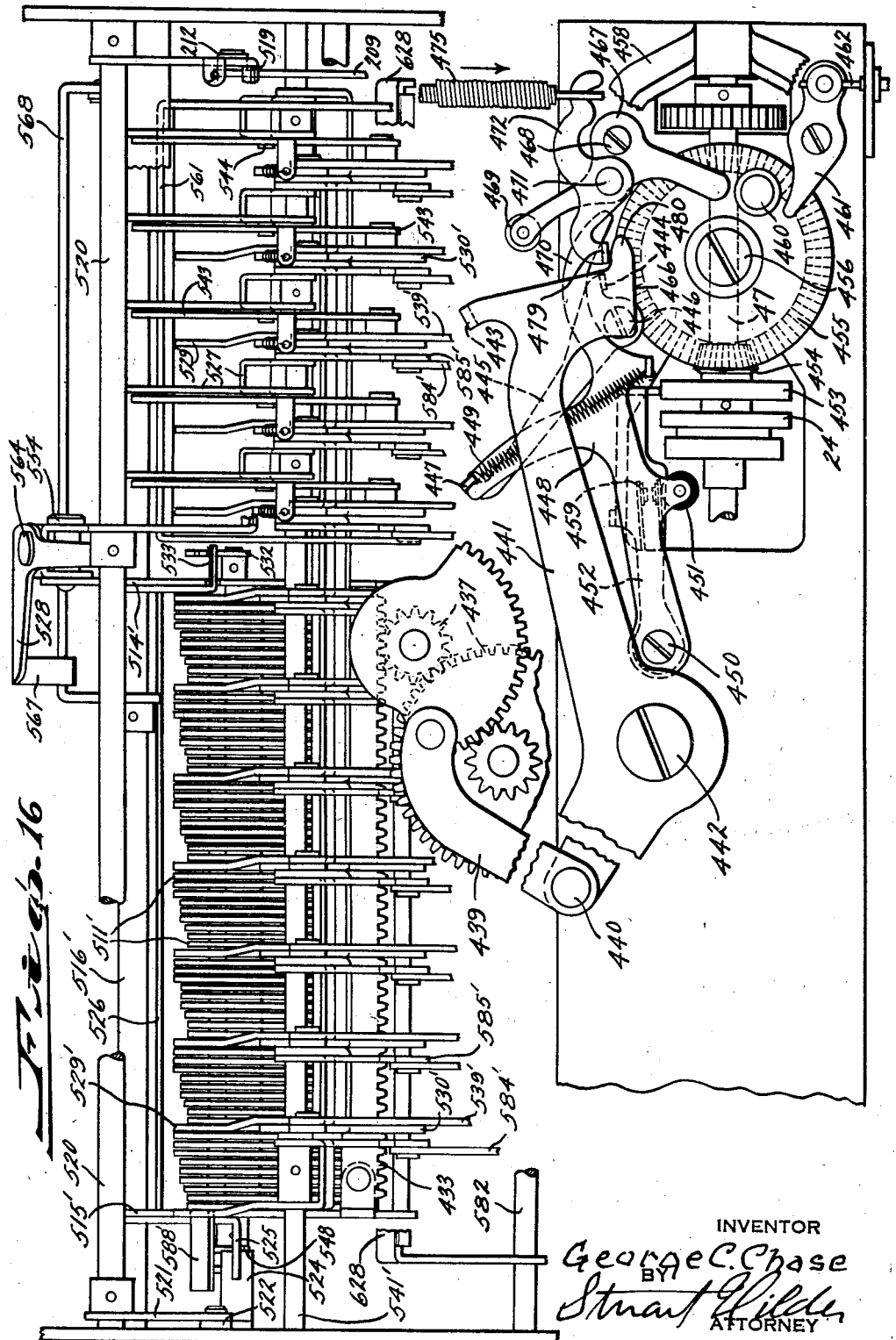
INVENTOR
George C. Chase
BY
Stuart Wilder
ATTORNEY Feb. 22, 1944.     G. C. CHASE     2,342,529
CALCULATING MACHINE
Filed April 29, 1941     15 Sheets-Sheet 14
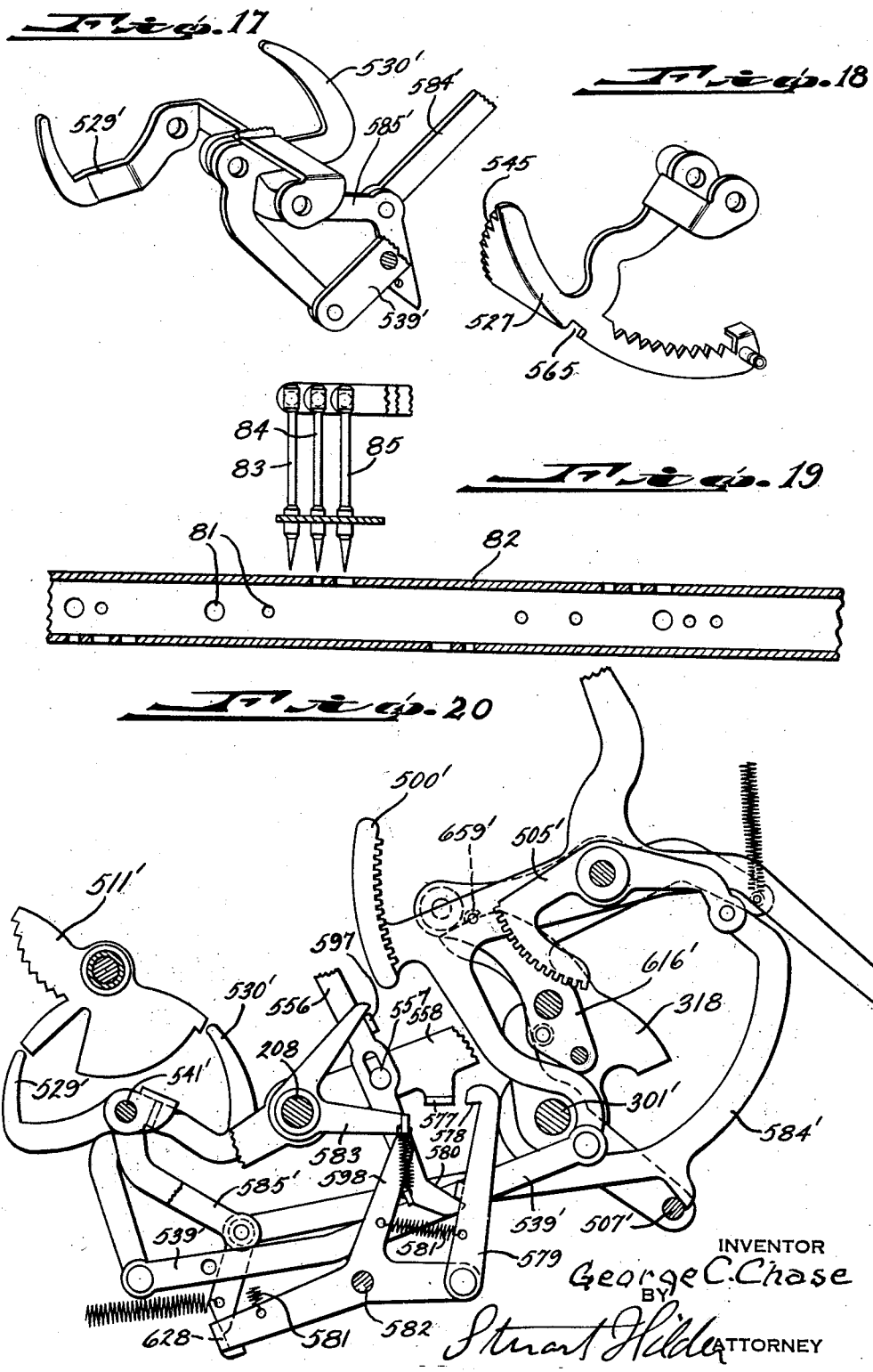

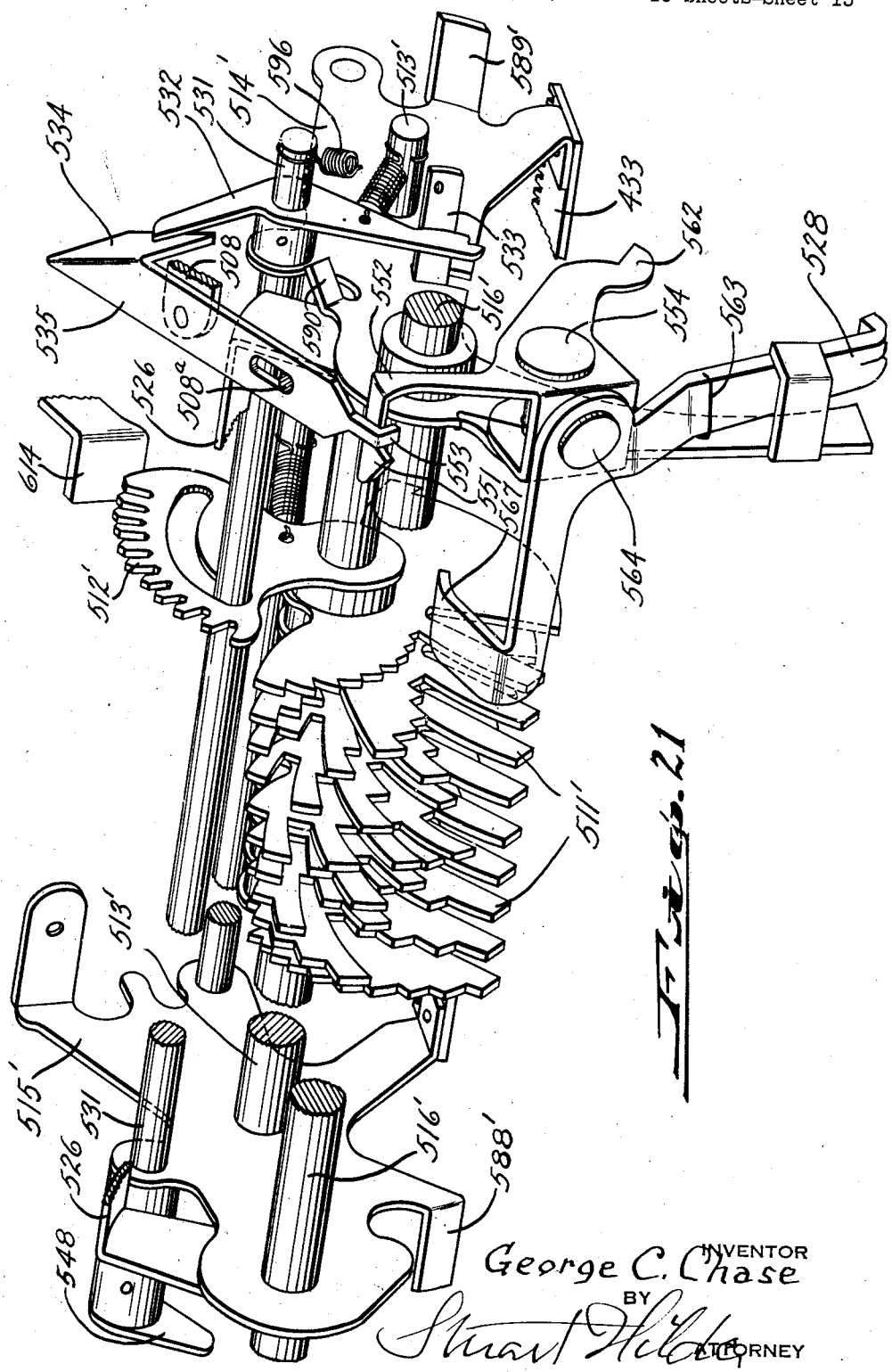

Patented Feb. 22, 1944

2,342,529

UNITED STATES PATENT OFFICE 2,342,529

CALCULATING MACHINE

George C. Chase, South Orange, N. J., assignor to Monroe Calculating Machine Company, Orange, N. J., a corporation of Delaware Application April 29, 1941, Serial No. 390,945

10 Claims. (Cl. 235—60)

The invention has relation to calculating machines and more particularly to multiplier mechanism therefor.

Direct multiplying machines are well known in the art, whereby for each multiplier digit a machine will make an extended cycle of operation during which the units value of each partial product is added to the tens value of the partial product of next lower order. The differential actuators and related register wheels may thus be required to operate from one step to a maximum of seventeen steps during each cycle of operation, and two tens transfers may be required.

According to the present invention, it is the difference between the tens and the complement of the units which would be registered in each order, instead of the sum of the tens and the units, and the maximum difference is 9, whereas the maximum sum is 17. The difference, of course, may be plus or minus, the actuators being adapted to be operated in either direction from a central position as hereinafter described. For example, the partial product 72 has heretofore been registered as seven tens and two units, whereas it is proposed to be registered as 80 minus 8. According to this system the partial product table is rewritten as shown in Fig. 4.

Another feature of the invention relates to the adaptation of printing mechanism to a machine in which the units partial products are subtracted and the tens of partial products added, and to the means whereby simple additions and subtractions may be made in such a machine.

The invention consists in the novel construction and combination of parts, as set forth in the appended claims.

The invention is herein shown as applied to a listing calculator of the general type disclosed in the United States patent issued to Clyde Gardner, deceased, July 12, 1932, No. 1,867,002, as modified by the disclosures of United States Patent No. 1,932,013 issued to Loring P. Crosman on October 24, 1933, and United States Patent No. 1,946,572 issued to the same inventor on February 13, 1934. Reference is also made to United States application Serial No. 390,946 of even date herewith filed by Loring P. Crosman (corresponding in part to British Patent No. 518,840) and disclosing the means for registering and recording the product of two preset factors by a single continuous operation. The accumulator and tens transfer mechanism is of the crawl carry type and of well known structure such as disclosed in United States Patent No. 1,828,180 issued October 21, 1931, to Clyde Gardner, deceased. The present application is a continuation in part of application Serial No. 341,402, filed June 20, 1940.

In the accompanying drawings, illustrating the invention:

Fig. 6 is a vertical section taken through the keyboard, accumulator, printing and multiplying mechanisms.

Fig. 7 is a detail plan view of the split printing mechanism.

Fig. 8 is a detail rear elevation of the platen carriage tabulating means.

Fig. 9 is a fragmentary rear elevation of the machine, with the platen carriage removed and showing certain parts controlling the accumulator selecting clutch.

Fig. 10 is a left hand elevation of the machine with the casing removed and the side frame broken away, showing the accumulator selecting mechanism.

Fig. 11 is a right hand elevation of the accumulator control mechanism.

Fig. 12 is a detail right hand elevation of the hammer blocking mechanism for non-printing.

Fig. 13 is a right hand elevation of the total key and associated mechanism.

Fig. 14 is a right hand elevation taken just inside the framing, showing the control keys and associated mechanisms.

Fig. 16 is a bottom plan view of the same and showing the factor carriage return mechanism.

Fig. 17 is a detail perspective view of the units and tens product feelers.

Fig. 18 is a detail perspective view of a multiplier storage plate.

Fig. 19 is a detail plan view, with parts broken away, of a portion of the program control mechanism.

Fig. 20 is a fragmentary right hand elevation of the accumulator actuating mechanism.

Fig. 21 is a fragmentary perspective view of the factor carriage, showing one set of partial product plates.

In order to set forth the basic principles of this invention in simplified form, Figs. 1 to 4 have been prepared, showing its essentials as they might be combined with the registering and total printing devices of the well known Monroe adding-listing machine. The embodiment shown in these four figures is described in Part I of the specification. Figs. 5 to 20 illustrate other novel features which are essential to the embodiment of the invention in a machine which provides for full automatic operation in multiplication with the printing of both factors and the product, and to the combination with this multiplying mechanism of devices for the performance of simple adding, subtracting and listing operations. The constructions set forth in Figs. 5 to 20 will be described in Part II of the specification.

PART I

Figure 1:
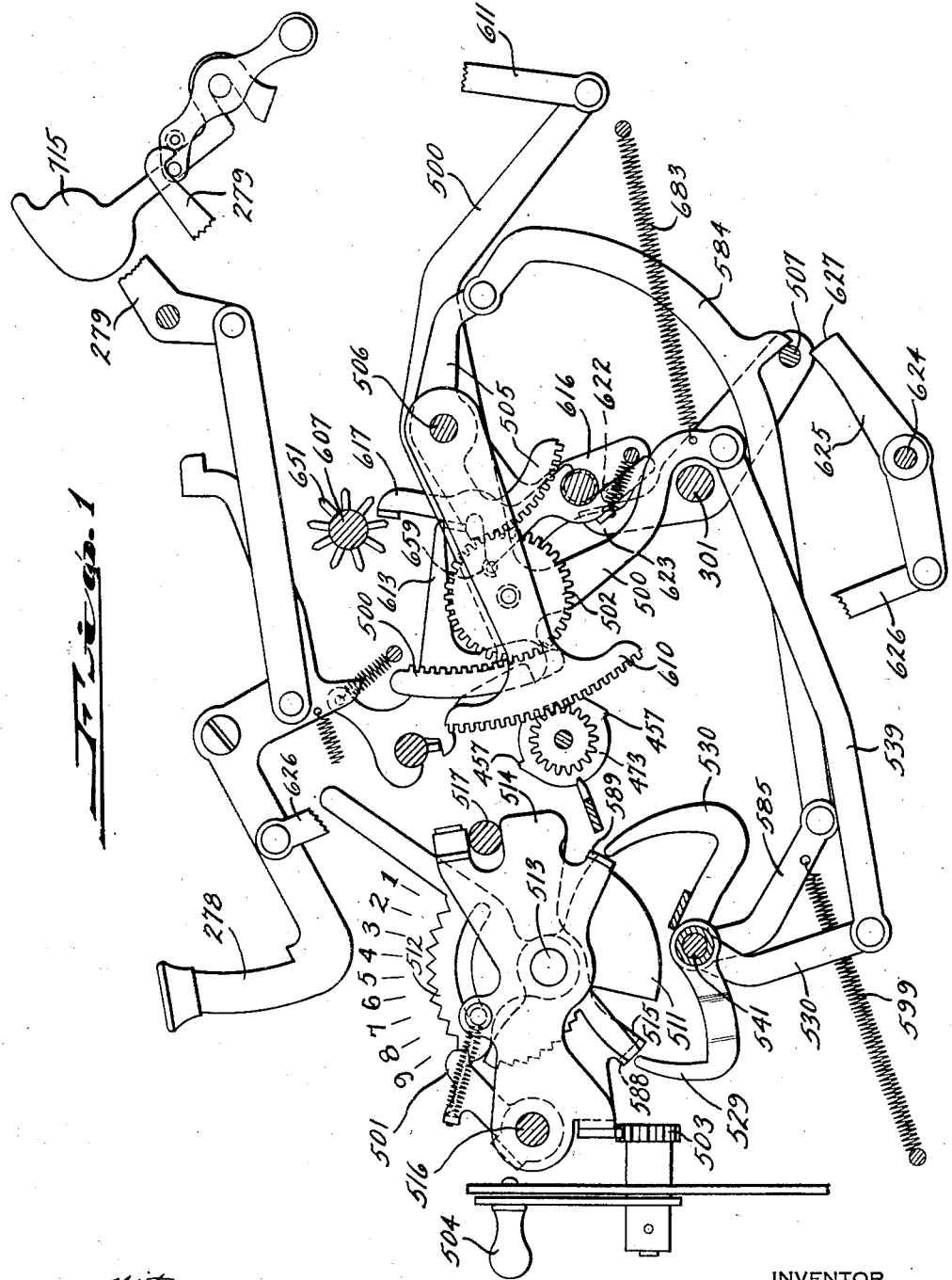
Figs. 1 and 2 are left hand and front elevations respectively of a simplified form of mechanism embodying the principles of the invention.
Figure 2:
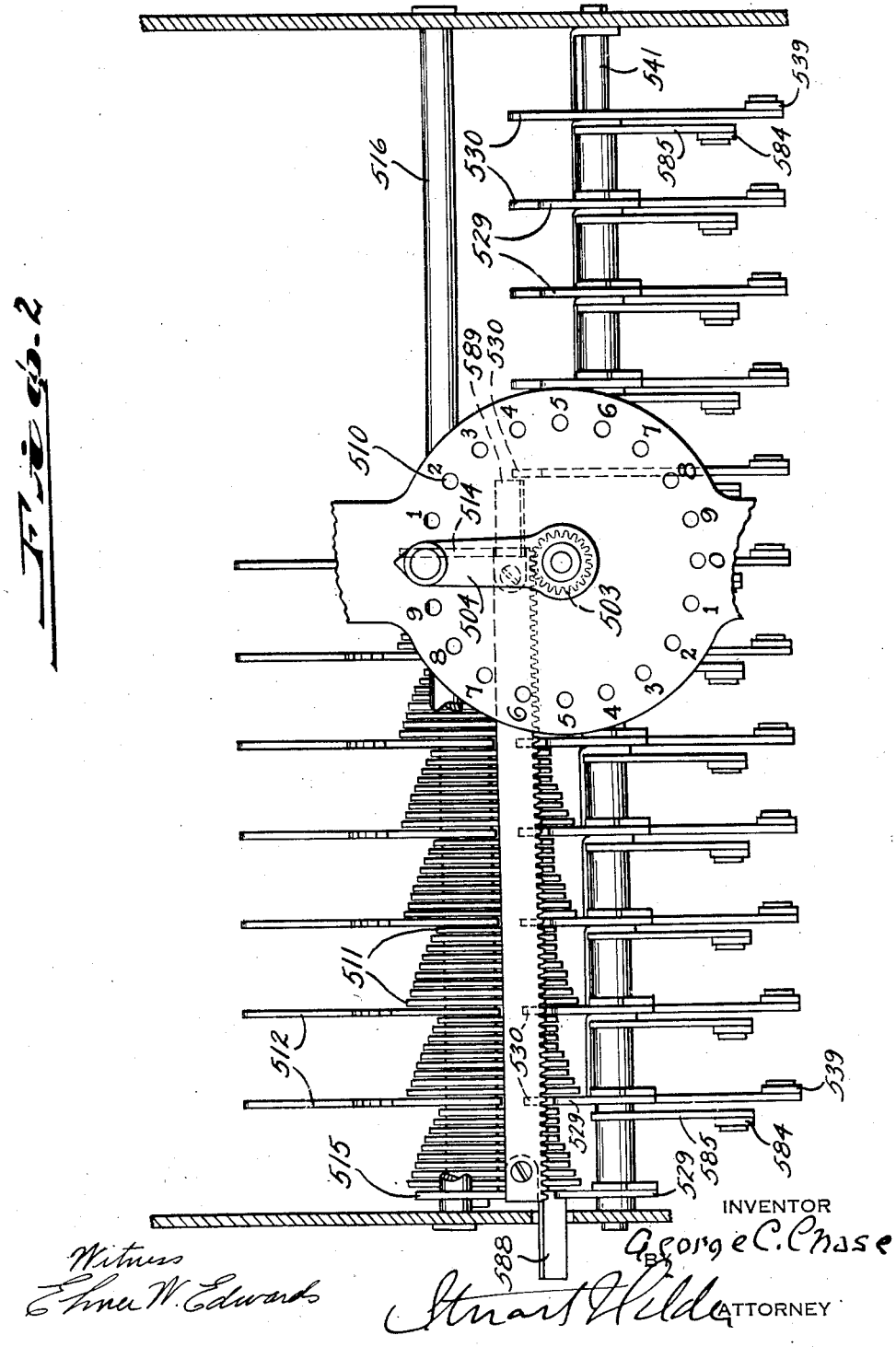
Figures 3, 4:
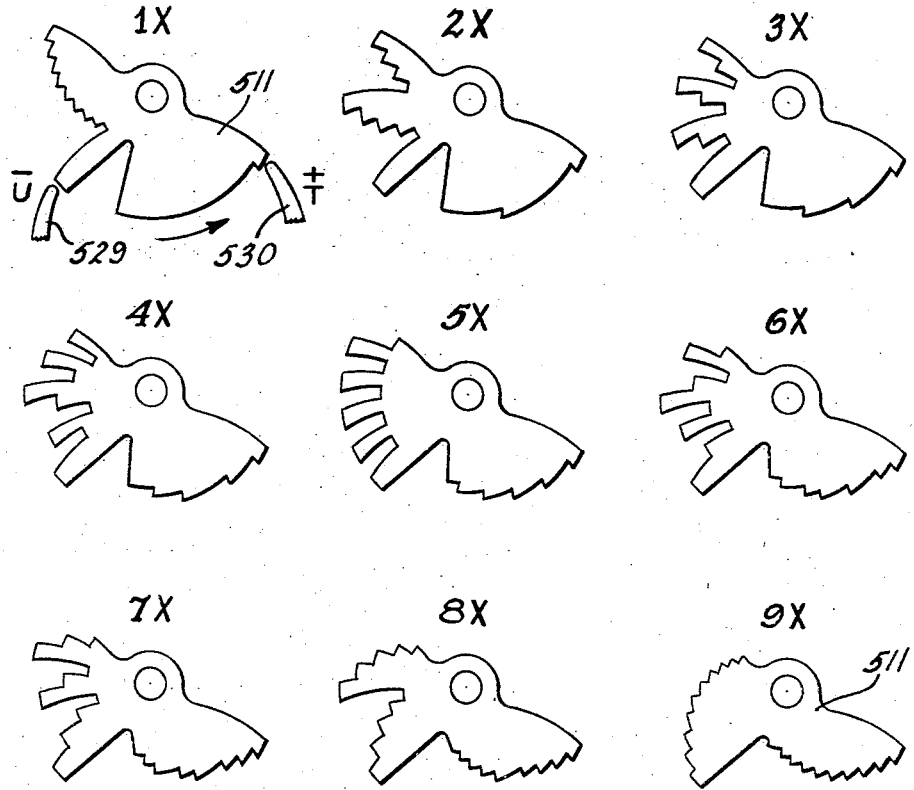
Fig. 3 is a series of detail elevations, showing the configuration of the partial product plates.
Fig. 4 is a table illustrating the values related to the index faces of the partial product plates.

The machine shown in Figs. 1 to 4 provides for a seven digit multiplicand, a five digit multiplier, and a twelve digit product. The multiplicand is set into a series of partial product plates 511, there being nine of these plates connected to form a unit in each order, each plate representing all of the partial product values of a digit of the multiplier, as illustrated in Fig. 3.

The nine plates of each order are fast upon the sleeve of a related setting plate 512, adapted to be manually adjusted in a counter-clockwise direction, as viewed in Fig. 1, in accordance with the multiplicand value. The multiplicand storage units (comprising the plates 511 and setting plate 512) are loosely mounted upon a transverse shaft 513 supported upon plates 514, 515 and forming therewith a transversely shiftable factor carriage, said carriage being slideably supported upon transverse rods 516, 517. The carriage may be normally positioned either in its extreme right or left hand position, since multiplication may be effected from right to left or from left to right, as desired.

The plates 511 are cut to varying radial depths according to the units and tens partial product values of the present system of registration, shown by the table of Fig. 4.

The multiplicand setting is adapted to control the pivotal movement of the plates 511 to bring the appropriate notches to a feeling line while the multiplier setting is accomplished digit by digit, by shifting the factor carriage in each decade and to a position therein at which the appropriate multiplier value plates are brought each into cooperative position with a related pair of feelers 529, 530, pivotally mounted upon the fixed shaft 541 secured to the main framing of the machine.

The partial product plates are held in adjusted position by means of spring tensioned clicks 501, while the factor carriage may be shifted and locked in adjusted position by means of a rack and pinion 503 under control of a suitable hand crank 504, the handle of which acts as a spring plunger, adapted to engage suitable orifices 510 in the forward framing of the machine, said orifices being numbered from zero to nine, representing the multiplier digits. As shown in Fig. 2, a 180° rotation of crank 504 is adapted to shift the factor carriage one decade, or ten steps of movement. In a five place multiplier machine, the crank 504 is limited to two and one half revolutions. It is to be noted that the setting plates 512 occupy the tenth zone in lieu of zero multiplier plates, since there would be no multiplying operation necessary for zero, the operator merely shifting the carriage through a zero multiplier to the next order.

Inasmuch as units of partial products are subtracted in this machine instead of being added as in prior art machines, the mechanism for the registration of the tens partial product digits serves as the normal registering and printing mechanism in other operations (addition and subtraction); for the printing of the factors and the product in multiplication, and for the installation of multiplicands from the keyboard, as described in the complete machine set forth in Part II. Consequently, this invention involves not only the provision of an improved multiplying mechanism, but necessitates the solution of several ancillary problems in the adaptation of the reorganized mechanism to other uses.

In a 7 x 5 x 12 place machine there would be twelve pairs of feelers 529, 530, the feelers 529 cooperating with the units portion of the partial product plates 511 and the feelers 530 cooperating with the tens portions of said plates to control registrations upon accumulator 473 in the following manner:

For each order of the machine there is fulcrumed upon transverse shaft 506 (Fig. 1) a three-legged differential mechanism comprising an output gear segment 610 adapted to engage with accumulator 473, and the input leg segments 500 and 505 having engagement with a planet gear 502 mounted upon segment 610.

The segments 500 serve several purposes, as will be subsequently explained. Each segment is connected by a link 539 with a tens feeler lever 530. Inasmuch as a tens partial product digit is never registered in the lowest order, the stepped partial product plate of lowest order never controls the movement of the lowest order segment 500. When the factor carriage is in its extreme right hand registering position the lowest order partial product plate aligns with the tens order of the machine. The units feeler lever in each order is connected by a link 584 with the segment 505 of next lower order.

As described in the reference patents, during an additive cycle of operation the accumulator 473 will be disengaged from the racks 610 upon the first part of the forward stroke of a machine cycle and reengage during the first portion of the return stroke, prior to the movement of racks 610. These racks are operated as follows:

Pivotally mounted upon a rock frame 616 supported upon shaft 506 are latching dogs 617 having engagement with studs 659 fast to the tens segments 500, and as said frame is moved counter-clockwise, as viewed in Fig. 1, during the forward stroke of the machine cycle, as hereinafter described and more fully set forth in the reference patents, the tens legs 500 of the differentials will be free to move in a counter-clockwise direction, under influence of their respective springs 683. Counter-clockwise movement of the tens segments 500 is adapted to impart a counter-clockwise rotation to the floating actuating segments 610.

Fast to the rock frame 616 is a stud 622 having engagement with an arm 623 of a bail 507, pivotally supported upon transverse shaft 301 and extending transversely of the links 584 of the units leg 505 of the differentials.

During the above described movement of frame 616 stud 622 will move away from bail 507, whereupon links 584 will be moved forwardly under influence of their respective springs 599 to impart clockwise movement to the units legs 505 of the differentials. Clockwise movement of segments 505 is adapted to impart clockwise movement to the actuating segments 610. Thus during the forward stroke of a machine cycle each actuating segment 610 will be adjusted in a clockwise or counter-clockwise direction in accordance with the resultant difference between the limited movement of the tens feeler 530 of the related order and that of the units feeler 529 of the adjacent higher order. Upon the return stroke of a machine cycle of operation, the accumulators 473 are engaged with actuating segments 610 and the parts returned to normal, so that said resultant values will be registered upon the accumulators as illustrated in the following example:

$$0005400 \times 00703 = 000003796200$$

As stated above, the factor carriage may be initially positioned at the extreme right, or the extreme left. If at the right, the group of nine partial product plates of the lowest (units) order of the carriage stand related to the tens order of registering mechanism. If at the left, the units order plates of the carriage would stand related with the hundreds of thousands registering order. We shall assume in this example that the carriage is initially at the left, and is shifted toward the right in making the computation.

The multiplicand is installed by manipulation of the extended arms of the plates 512 in the thousands and hundreds orders of the carriage, to bring them to the positions 5 and 4 (Fig. 1) respectively.

Now since naughts appear in the two highest multiplier orders and a 7 in the third order, the crank 504 is rotated 1⁷⁄₂₀ revolutions; that is, through two decades and into the third, where it is stopped and the plunger located in the orifice marked 7 (Fig. 2).

This done, the plate which was set at 5 presents a +4 value index face opposite the tens feeler of the same order, and a −5 value opposite the units feeler connected with the next lower registering order. The plate which was set at 4 presents a +3 value to the tens feeler of its order, and a −2 value to the units feeler which registers in the next lower order; that is, the partial product plates of the carriage have been set as follows:

Tens _____ 0 0+4+3 0 0
Units _____ 0 0−5−2 0 0

Now, since the units feeler levers are each connected for registration upon the wheel of the next lower order, these values are registered as

```
  0   0+4+3   0 0
      0 0−5−2   0 0
  ─────────────────
  0   0 3 7 8 0 0
```

This registration is effected by swinging the rocking frame 616 rearwardly and forwardly once, as is customary in machines of this type.

Since there are more feeler levers 529, 530 than there are sets of partial product disks in the carriage, the feelers beyond the carriage range must be considered. A projection 588 (Figs. 1 and 2) is provided on the left hand end frame 515 of the carriage which will prevent movement of the units feeler adjacent the left of the carriage. A similar projection 589 is provided on the right end frame 514 to prevent movement of the next adjacent tens feeler to the right of the carriage, whenever the crank 504 is positioned in an orifice 510 representing one of the multiplier digits 1 to 9. These two projections cooperate with the tens and units stops respectively of the plates 511, and may be considered as partial product plates having a fixed value of 0.

All the rest of the feelers beyond the range of the carriage will be free to move the full extent of their movement of nine steps, these movements effectively cancelling out, so that the whole action of the first cycle of operation is as follows:

```
         0 0 5 4 0 0          Multiplicand
               7              ×multiplier of 7 in hundreds order
  +9 9|0 0 0 4 3 0 0|0 9 9    Tens
  −9 9 0|0 0 0 5 2 0 0|9 9    Units
   0 0 0|0 0 3 7 8 0 0|0 0    Partial product registration
        ←─────────────→
         carriage range
```

Since the next multiplier digit is naught, the carriage is now shifted two decades; that is, through two naughts, and the handle plunger positioned in the orifice marked 3, which requires 1⁶⁄₂₀ of a revolution of crank 504, and the machine is again operated for one cycle, in which the action is as follows:

```
             0 0 5 4 0 0      Multiplicand
                   3          ×multiplier of 3 in units order
  +9 9 9 9|0 0 0 2 2 0 0|0    Tens
  −9 9 9 0|0 0 0 5 8 0 0|     Units
   0 0 0 0 0 0 1 6 2 0 0      Partial product registration
            ←─────────→
              carriage
               range
```

The accumulated product of both cycles would be:

```
  0 0 0 0 0 3 7 8 0 0 0    First partial product registration
 +0 0 0 0 0 0 0 1 6 2 0 0  Second partial product resigtration
  0 0 0 0 0 3 7 9 6 2 0 0  Total product
```

Any tens transfer would be taken care of by the transfer mechanism inherent in the register, as fully described in United States Patent No. 1,828,180.

It is to be noted that the units feeler related to the highest order accumulator wheel and the tens feeler related to the lowest order accumulator wheel never come under the control of a partial product plate.

PRINTING MECHANISM

As stated above, this invention includes the provision of means whereby factors and products may be printed through the tens registering input leg of the differential actuating mechanism. In this simplified showing of Part I, the printing of the factors has been omitted for the sake of clearness, a latch 279 being provided to lock the printing hammers 715 in normal position during multiplying operations. The printing of totals, however, is shown, so that the essentials of combining printing mechanism with a multiplying device such as this may be readily understood.

Before taking a total, the crank 504 must be positioned at a zero orifice, in order that the tens feeler levers 530 may have an unobstructed path of movement.

Depression of total key 278 will not only disengage latch 279 from the hammer mechanism but will activate means for rotating the shaft 607 having a helically arranged row of pins 651 acting to trip the latching dogs 617 successively from right to left of the machine, as set forth in the reference patents and hereinafter more fully described. The successive tripping of these dogs serves to successively release the segments 500 which in turn operate the segments 610, and also serves to release stop members 613 so that they will fall into the path of the zero stops 457 on the accumulator wheel 473.

It is to be noted that each wheel is provided with two of these stop projections 457 instead of with but one as in the patents cited. This results from a change made to reduce the overall swing of segment 610, by providing the registering wheel with twenty value positions instead of ten; that is, one revolution of the wheel carries the wheel twice through the digit series 0 to 9.

When the zeroizing operation has progressed to the left hand side of the machine a total printing cycle of operation is performed, whereupon frame 616 will carry the dogs 617 counter-clockwise, as viewed in Fig. 1, so that they will snap under the stop members 613 and studs 659 of levers 500.

The type bars 611 are pivotally secured to the rearward arm of levers 500 and will thus be moved to printing position during the totalizing operation, the usual printing hammers 715 being tripped near the end of the forward stroke of the cycle of operation to print the total.

Upon return movement of frame 616, the levers 500, segments 610 and total stops 613 will be restored to normal position.

Since a total taking operation is performed through the tens legs only of the differentials, the following means are provided for locking the units lugs during total taking:

Fulcrumed upon a shaft 624 is a lever 625, the forward arm of which has link connection 626 with the total key 278. Upon depression of key 278 lever 625 will be rocked counter-clockwise (Fig. 1) about shaft 624 to bring the surface 627 of said lever into the path of movement of the transverse bail 507 previously described, locking said bail against forward movement and also, through links 584, locking the units legs 505 of the differentials.

In Part II it will be shown how additions and subtractions may be made directly from a keyboard setting, independently of the stepped partial product plates.

PART II

AUTOMATIC MULTIPLYING MACHINE

The automatic multiplying machine herein disclosed is a twelve bank adding lister wherein the seven left hand columns of digit keys are used to set up the multiplicand and the five right hand columns for setting up the multiplier, the complete multiplicand and multiplier being simultaneously set upon the keys 215.

Upon depression of a multiplying operation key 201 (Fig. 5) the machine is adapted to perform a preliminary cycle of operation, during which the multiplicand value and the multiplier value will be set in suitable storage devices and simultaneously printed upon a record sheet.

Upon completion of the set up cycle, the machine will automatically compute the product, performing one cycle of operation relative to each order of the multiplier wherein a value other than zero has been stored.

Suitable program means under control of the record platen carriage 5 is provided, to adjust the accumulators 473' in the manner appropriate to the different steps of the calculation.

At the end of the specification will be found a resume of the successive actions of the different machine elements in effecting a multiplication.

NORMAL ADDITIONS AND SUBTRACTIONS

Normal additions and subtractions are accomplished as in the machine illustrated in the reference patents, amounts being set up on the twelve bank keyboard 215 (Figs. 5 and 6) and accumulated in one or more accumulators 473', either additively by engagement of an accumulator during the upward stroke or subtractively by engagement thereof during the downward stroke of reciprocatory actuating segments 610'. The segments are reciprocated by movement of a rock shaft 301' (see particularly Patents No. 1,867,002 and No. 1,932,013), preferably driven by an electric motor 48, said rock shaft having a cam 318 (Figs. 6 and 20) adapted to move the rocking frame 616', thereby cooperating with the springs 683' (Fig. 6) of the tens legs 500' of the differentials previously described to effect movement of the segments 610'. The extent of movement of each segment 610' is normally limited by engagement of a stop bar 615, carried by an upwardly extending arm 500a of the tens leg of the differential, with the lower end of a depressed key 215 whereby the extent of this movement will correspond to the value of such depressed key, the units leg 505' of the differential being normally held in zero position by means of a transverse bail 628.

Figure 5:
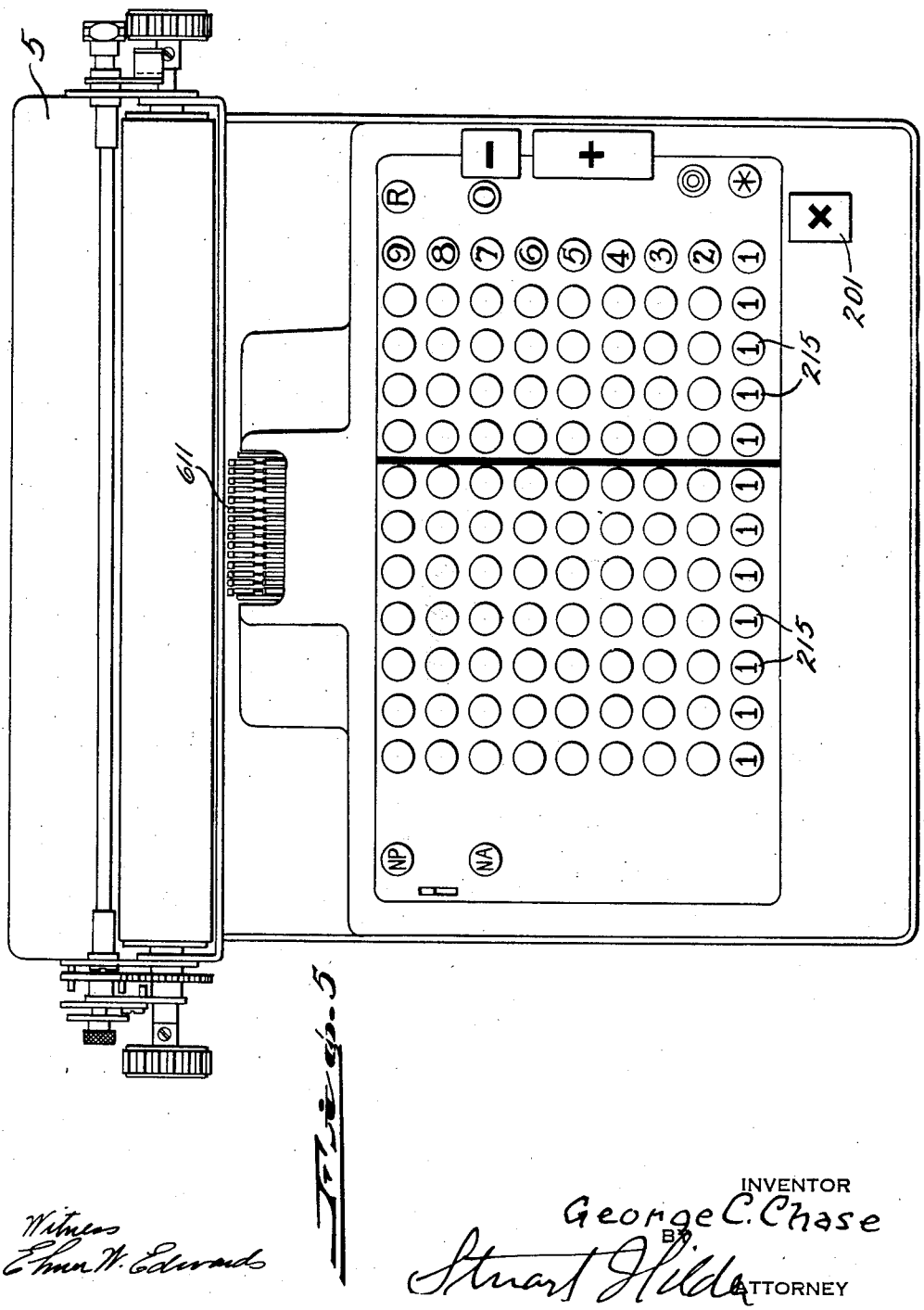
Fig. 5 is a plan view of a machine embodying the invention.

Depression of a key 215 will also operate a slide plate 191 of the related column to release column latch 214, adapted to hold bars 615 in rearward or zero position. Type bars 611' are connected with the rearwardly extending arms of levers 500' and are raised thereby to bring the appropriate type to the printing line. Before the return of the adjusted segments by the frame 616', spring type hammers 715' will be released by triggers 701, to print the item on a record sheet supported in the transversely shiftable platen carriage 5 (Figs. 5 and 11). The type hammers 715' are adapted to be operated by spring actuators 700, but are normally held in tensioned position by triggers 701. When a type bar is lifted a tripping finger 702 is allowed to move into engagement with the corresponding trigger 701, and at the end of the forward rotation of shaft 301', a frame upon which the tripping fingers are mounted is moved forwardly, releasing the hammers from those triggers which have been engaged by the fingers 702. In order to print the zero characters in the lower order places wherein no amount from 1 to 9 has been set up, the higher order triggers 701 are provided with offsets 703 (Figs. 6 and 7) lying in the planes of and designed to trip the lower order triggers.

The hammers are restored and relatched during the return rotation of shaft 301' by means of a bail 707 operated through a reciprocatory cam 704 (Fig. 10).

PROGRAM MEANS FOR SELECTING ACCUMULATORS AND CHARACTER OF REGISTRATION

A tabulating bar 1 (Fig. 8 and Patent No. 1,946,572) is supported within the frames of the platen carriage 5 and is provided with a series of notches 2, spaced in accordance with the columnar rulings of a given form sheet, and adapted by engagement with a projection 6 of a lever 7 to secure the carriage against lateral movement under influence of the usual spring shifting means (not shown).

As described in Patent No. 1,946,572, the adjustment of platen carriage 5 to a tabulated position will impart reciprocatory movement to a lever 20 upon which is mounted a stud 23 adapted to trip the one cycle register selecting clutch 24 (Fig. 9) as follows:

The return movement of lever 20 will release latch 27 from engagement with a spring tensioned plate 33, through engagement of stud 23 with trip pawl 25, whereupon said plate, under influence of its spring 35, will be rocked clockwise about point 34, arm 36 of said plate contacting a pin 37 of clutch releasing bail 39 to initiate operation of the one cycle clutch 24, having connection through gear train 50 with the motor 48.

During this movement of plate 33 an arm 59 of said plate will engage projection 60 of a lever 61 (Fig. 11), rocking said lever about its fulcrum 62 to cause an insulated roller 63 to close the contact points 64 (Fig. 14) of switch 65, interposed in the circuit of electric motor 48.

At the completion of an accumulator selecting cycle a cam 55 (Fig. 9) driven by the clutch 24 will act to restore plate 33 to normal position.

Operation of clutch 24 is adapted to impart counter-clockwise movement to a crank arm 58 (Fig. 10).

In each tabulated position of carriage 5 appropriate index perforations 81 (Fig. 19) of a tubular bar 82, supported in the framing of the carriage 5 (Fig. 9), will be positioned opposite plungers 83, 84 and 85, each plunger serving to control the setting of one of the three accumulators 473'. Upon engagement of clutch 24, these plungers will be yieldably driven toward bar 82, by means of a rock arm 69, having link connection 67 with crank arm 58. The margins of perforations 81 will variably limit the rearward movement of said plungers and correspondingly adjust cams 73 and 74 (Fig. 10) related to each plunger, to cooperate with a roller 71 of rock arm 69. Adjustment of cams 73 and 74 relative to roller 71 is adapted to control the extent of movement of the segment 105 and accumulator control gears 474 to set collar cams 438 (Fig. 11), mounted on the accumulator shaft, relative to the surfaces 123 of a cam plate 419. Reciprocation of plate 419, during subsequent operation of the machine, serves to adjust the accumulators for non-add, add or subtract operation, as fully described in the patents hereinbefore mentioned. The cam plate 419 has connection through link 321 with an arm 322 of a rocker device 325, provided with two cam followers adjustable by key set control devices to different positions relative to cam arms 316 and 320 secured to rock shaft 301'.

Normally these control devices are set to provide for additive registration, wherein the surface 123 of plate 419 is rocked free of the collar cams 438 to disengage the accumulator during the first part of an operative cycle of the machine, before the reciprocatory racks 610' are allowed to move, the plate being moved to re-engage the accumulator while the racks lie in their extreme operated position.

Upon return movement of the racks the value set in the keyboard will be additively transferred to the accumulator.

The program for automatic multiplication is as follows:

The platen carriage 5 having been manually or automatically set to the right hand tabulated position, the index bar 82 will provide for a non-operative condition of all of the accumulators 473' during the preliminary factor installing cycle of operation, during which cycle values are set up on multiplicand storage disks 511' (Figs. 6, 15, 16 and 20) and multiplier storage plates 527 (Figs. 6, 15 and 18) and are printed upon the record sheet. Near the end of this cycle the platen carriage will be automatically shifted to a second tabulated position wherein index bar 82 provides for additive adjustment of the product accumulator during multiplying cycles. Upon completion of the final order multiplying operation the platen carriage will be shifted to a third position, wherein the product accumulator will be engaged for total taking and one or more other accumulators may be brought into operative position by the program bar 82 to receive the product by a transfer operation. A total taking cycle of subtractive operation will be initiated by the automatic depression of total key 278' (Fig. 13) following the multiplying cycle.

TOTAL PRINTING

As previously described a total is taken by successively releasing the segments 500' (Fig. 6) of the differentials and allowing them, through segments 610', to rotate the accumulators subtractively until suitable projections on the accumulator wheels contact with zero stops. This will set the total into the type bars, and the hammers will be tripped to print the total. The segments 500' are then re-engaged with the oscillating frame 616' and during the return stroke of said frame are moved rearwardly to normal position, the accumulator wheels being disengaged from the racks before the return stroke is made, whereby the accumulator which has been totalized will remain at zero.

The machine is set for reverse or subtractive operation (described in Patents No. 1,867,002 and No. 1,932,013) by contact of the total key 278' with a pin 352 (Fig. 14) on rocker control plate 326, the total key thus holding the plate out of the path of clockwise rotation of the forward cam follower of rocker 325, so that said rocker will not be operated by cam arm 320, and the accumulators will not be disengaged at the beginning of the operation. On the return stroke of the parts, the forward cam follower, coacting with cam arm 320, will disengage the active accumulator from the segments. The described setting of plate 326 also displaces the rear cam follower of rocker 325. At the end of the cycle of operation the pin 350, fast to reciprocating cam 318 (Fig. 11) will contact with arm 322 and restore rocker 325.

Depression of the total key 278' will not only trip the column latches 214 (Fig. 6), through pin 263 and rocker 227 (Figs. 6 and 13), but will also trip a latch 620 (Fig. 13 and Patent No. 1,932,013), through operation of a lever 206 and a control arm 621 pivotally connected to said latch. Latch 620 normally engages a lug on total segment 618, preventing movement of said segment under the influence of total spring 681. Upon tripping of the latch, segment 618 will operate a shaft having a helically arranged row of pins 651' (Fig. 6) acting to trip the latching dogs 617' successively from right to left of the machine, the tripping of said dogs releasing the levers 500' to operate segments 610' and also releasing stop members 613' so that they will fall into the path of the zero stops 457' on the accumulator wheels.

When this zeroizing operation has progressed to the left hand side of the machine, a pin 481 (Fig. 13) of a rearwardly extending arm of the total segment 618 will contact with a projection of a rod 130 connected at its other end to a trigger 131, adapted to release latch 148 and thereby engage the main clutch. The machine being put into operation, frame 616' (Fig. 6) will carry the dogs 617' rearwardly, so that they will snap under rearward extensions of the stop members 613' and studs 659' of the segment arms 500'. The hammers will now be tripped, and upon return movement of frame 616' the levers 500', segments 610', and total stops 613' will be restored to normal position. The main clutch, being of the one cycle type, will be automatically released at the end of the cycle to conclude the operation.

The total key is locked in depressed position by latch 223 (Fig. 13), and is released near the end of the cycle of motor operation by engagement of a finger of rock arm 163 (Fig. 11), driven by parts 162 and 316, with a click pawl 222 of latch striker 220 (Fig. 13), the parts of the total setting mechanism thus being restored to normal position.

The mechanisms above set forth are all described in more detail in the patents hereinbefore referred to.

Means for Initiating the Preliminary Cycle of Operation

The multiplier and multiplicand values having been set up on keys 215 and the platen carriage positioned, the only remaining manipulation necessary for the completion of the calculation, including the printing of both factors and the product, is that the operator shall depress the multiplying key 201 (Fig. 14). The first action resulting therefrom is the installing and printing of the factors by the preliminary cycle of operation, which is initiated as follows:

The multiplying key 201 is fulcrumed at 201a and has link connection 202 with a trigger 509, pivotally mounted upon a transverse shaft 405 and adapted upon depression of the multiplying key to trip latch 148 from clutch lever 150. The lifting of latch 148 is momentary, continued movement of link 202 releasing the latch, which is allowed to fall on top of lever 150, ready to relatch the lever at the end of the cycle.

As fully described in the aforementioned Patent No. 1,932,013, disengagement of hook 148 from lever 150 will allow said lever, under influence of spring 151 (Figs. 11 and 13) to be rocked out of engagement with the projection 152 of a pawl 153, pivotally mounted on a crank arm 155, allowing said pawl under influence of its spring 156 to be rocked into engagement with a notched disk 157, fast to the hub 158 of gear 50 (Fig. 9) having drive connection with motor 48.

During this movement of lever 150 the surface 159 thereof (Fig. 14) will contact a stud 160, fast to the lever 61 and rock said lever downwardly, the insulated roller 63 fast thereto effecting contact of the points 64 of the motor switch 65. Crank arm 155 has link connection 161 (Fig. 11) with cam 316, fast to shaft 301', which controls the operation of the machine.

The multiplying key 201 is locked in depressed position by means of a spring tensioned latch 508 pivotally supported at 508a from the underside of the keyboard plate (Figs. 14 and 15), the trigger 509 being thus held in operated position, free of latch 148.

Multiplicand Storage Devices

During the preliminary cycle, stop bars 615 (Fig. 6) will be carried forwardly until stopped by engagement with the depressed keys.

Figure 15:
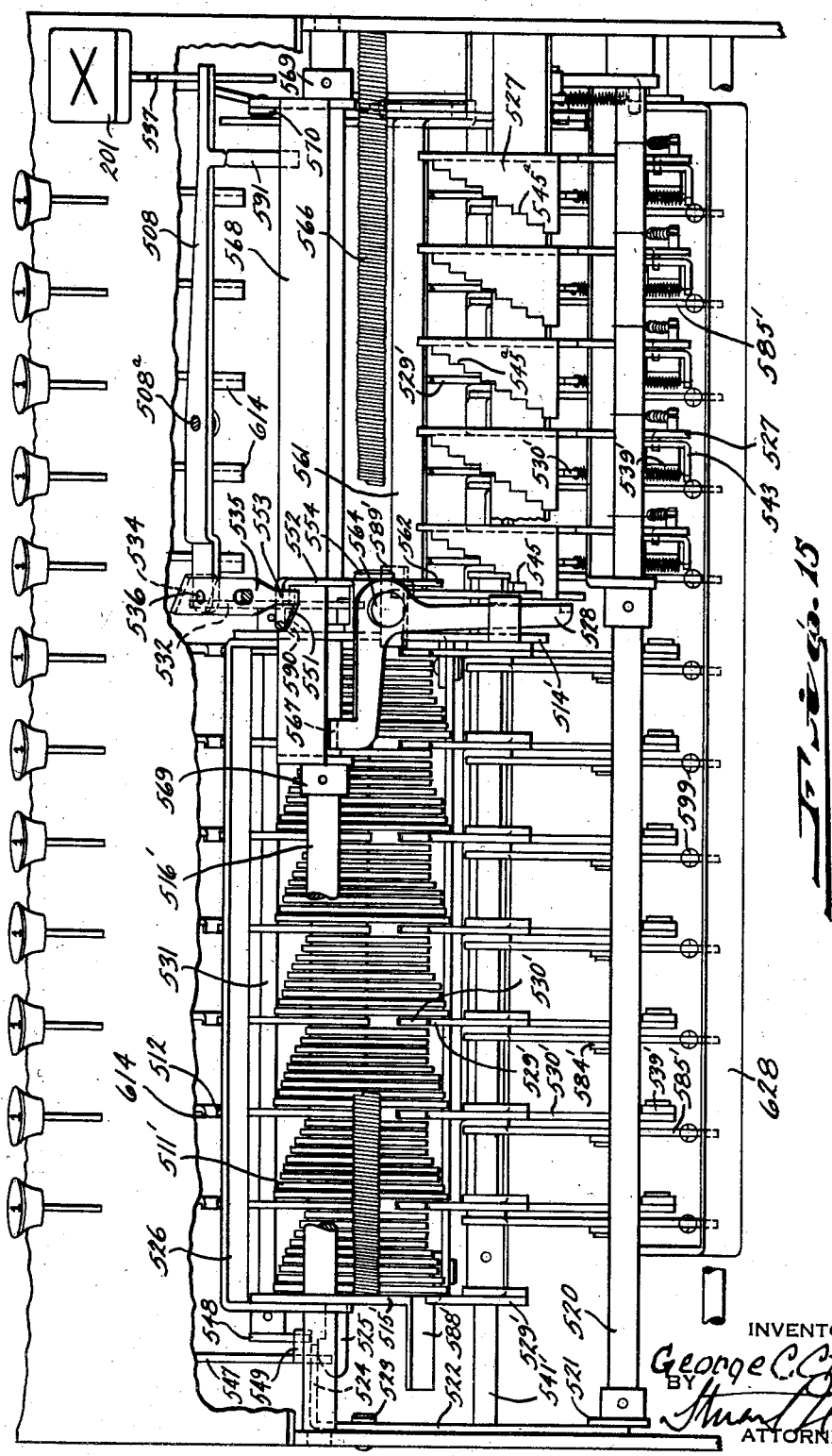
Fig. 15 is a front elevation, with casing broken away, showing the multiplicand and multiplier storage devices.

As previously described, the nine partial product plates 511' related to each multiplicand order are fast upon the sleeve of a related setting plate 512' (Figs. 6 and 15). During the forward movement of stop bars 615, plates 512' are rotated in a counter-clockwise direction by engagement of the rear faces of the plates each by a projection 614 of the related bar 615, to set the multiplicand storage plates 511'.

The transversely shiftable factor carriage 513', 514', 515' (Fig. 21), upon which are supported the plates 511', is normally positioned toward the left, with the plates 512' in cooperative relation with the seven left hand columns of bars 615, controlled by the keys 215 of the multiplicand keyboard.

The partial product plates having been adjusted during the forward movement of bars 615 are locked in set position during the first portion of the return stroke of the machine, prior to the return movement of stop bars 615, as follows:

Fulcrumed upon rod 208 (Fig. 14), fixed in the framing of the machine, is a lever 209 provided with a roller 210 lying in the path of movement of a double-faced cam 211 secured to arm 316 of operating shaft 301'. A forward arm of lever 209 is provided with a roller 212 adapted to engage the arm 518 of a transversely extending bail 519, fast upon rod 520, pivotally supported in the framing of the machine. Fast to the left hand end of rod 520 (Fig. 10) is a rearwardly extending arm 521 having pivotally mounted thereon a slide 522 supported from the framing at its upper end by pin and slot engagement 523. During the forward movement of cam arm 316 previously described cam 211 will pass over roller 210. Upon return movement of arm 316 cam 211 will impart counter-clockwise movement to lever 209, the roller 210 passing along the upper surface of said cam until released and centralized at the end of the cycle. Counter-clockwise movement of arm 209 will cause roller 212 to impart clockwise movement to shaft 520 (Fig. 14, counter-clockwise movement as viewed in Fig. 10), whereupon arm 521 will move slide 522 downwardly. Slide 522 is provided with a projection 524 normally overlying a projection 525 formed in a locking bail 526 pivotally supported upon the bushings of the end plates of the factor carriage and extending across the multiplicand setting plates 512' (Fig. 15).

Downward movement of slide 522 will, therefore, rock bail 526 into engagement with the serrated edge of plates 512', locking said plates and the partial product plates in their adjusted positions.

Fast upon the right hand end of a shaft 531 (Fig. 6) pivotally mounted in the end plates of the shiftable factor carriage is a spring tensioned latching pawl 532, normally held out of engagement with a projection 533 of locking bail 526 by the cam projection 534 (Figs. 6 and 15) of a slide 535 pivotally connected at 536 to the multiplying latch lever 508. Upon depression of the multiplying key 201, latch lever 508 in moving into engagement with the notch 537 (Figs. 14 and 15) of said key will move slide 535 forwardly, releasing latching pawl 532, whereupon said latch will be free to engage projection 533 of locking bail 526 as said bail is moved into engagement with the plates 512', thereby latching said bail in engaged position during the computation of the product.

MULTIPLIER STORAGE MECHANISM

For each order of the multiplier there is provided a stepped plate 527 (Figs. 6, 15 and 18) loosely mounted upon a fixed shaft 541' secured to the main framing of the machine and rotatably adjustable relative to the factor carriage locating finger 528 in accordance with the multiplier digit value. As previously described, the multiplicand setting is adapted to control the radial extent of movement of the plates 511' to bring appropriate notches to a feeling line, while the multiplier setting will position the carriage so that the plate 511' (of each order) representing the set multiplier digit will be brought into the zone of the feeler levers 529' and 530' (Figs. 6, 7 and 20).

Pivotally secured at 538 (Fig. 6) to each of the levers 500' of stop bars 615 related to the multiplier keys is a link 539', the forward end of which is pivotally secured at 540 to the tens feeler members 530', also loosely mounted upon shaft 541'. Pivotally mounted at 542 near the forward end of each of the links 539' is a spring tensioned latch 543 normally in engagement with a projection 544 of the related multiplier plate 527. The plates 527 are provided with nine laterally spaced stepped surfaces 545 (Figs. 15 and 18) corresponding to the multiplier digits 1 to 9. Upon forward movement of any of the multiplier stop bars 615 during the set up cycle the related links 539' are carried rearwardly and, through latches 543, will adjust the stepped surfaces 545 of the plates 527 relative to the locating finger 528 in accordance with the multiplier digit values. This will provide for the positioning of all the corresponding value partial product plates 511' relative to feelers 529', 530'.

The multiplier storage plates are adapted to be locked in adjusted position by the engagement of bail 519 with the serrated edges 546 of said plates, upon rotation of the rod 520 previously described, said bail being locked in engaged position during the computation of the product by a latch 547 (Fig. 10), engaged with the projection 524 upon downward movement of slide 522. Latch 547 is normally held free of projection 524 by engagement of an arm 548, fast upon the left hand end of shaft 531 of the carriage, with the projection 549 of latch 547. However, upon the previously described movement of latch 532 (Fig. 6), arm 548 will be moved away from the projection 549 of latch 547.

Since in multiplying cycles links 539' must be free to operate, the bail 519 above described is also adapted by engagement with the surface 550 of latches 543 to disengage said latches from the projections 544 of multiplier plates 527.

MEANS FOR RELEASING THE FACTOR CARRIAGE AND INITIATING MULTIPLYING CYCLES

The factor carriage is normally held in extreme left hand position by engagement of a hooked end 551 (Figs. 6, 14 and 15) of a rocker device 552 with the projection 553 of the slide 535 previously described, rocker device 552 being pivotally secured at 554 to the right hand frame plate 514' of the factor carriage.

Pivotally secured at 555 (Fig. 14) to the multiplying key 201 is a link 556 having pin and slot connection 557 with a lever 558 pivotally supported upon the shaft 208. Lever 558 is normally held by said connection in the position illustrated in Fig. 14, wherein the rear surface 559 of said lever is in raised position, out of the path of movement of a pin 560 fast to the projection 370 of crank arm 155.

Upon depression of key 201, however, lever 558 will be rocked clockwise, under influence of a suitable spring, to the position illustrated by dotted lines in Fig. 14, whereupon surface 559 is positioned for engagement by pin 560, in its counter-clockwise movement, near the completion of a cycle of operation.

The forward arm of lever 558 forms a crossover bail 561 having engagement with the projection 562 of rocker 552, and during the initial movement of lever 558 the bail will be moved upwardly, whereupon rocker 552 will be rocked slightly in a counter-clockwise direction under influence of its spring 563.

Pivotally secured at 564 to rocker 552 is the carriage locating finger 528 (Figs. 14 and 15), normally held in the forward position illustrated in Fig. 14. During the above movement of rocker 552 finger 528 is brought to the rearward position shown in Fig. 6, wherein said finger will cooperate with one of the laterally stepped surfaces 545 of a displaced multiplier storage plate 527 to position the factor carriage according to the denominational multiplier digit value.

As previously described, the slide 535 is moved forwardly upon engagement of latch lever 508 with the notch 537 of key 201. However, the above movement of rocker 552 will prevent release of the factor carriage at this time, the parts assuming the position of Fig. 6.

Near the end of the set up cycle pin 560 (Fig. 14) will engage the surface 559 of lever 558, displacing said lever, and through bail 561 the rocker 552 will be rocked out of engagement with the projection 553 of slide 535, whereupon the factor carriage will be free to move toward the right under influence of its spring 566 (Fig. 15). Pin 560 passing beyond surface 559, lever 558 and rocker 552 will resume the positions shown in Fig. 6, and the factor carriage will be stopped by engagement of locating finger 528 with the first (highest order) stepped plate 527 which has been set into its path. The clutch now coming to full cycle position, lever 150 will be displaced by projection 370 of crank arm 155 and re-engaged by latch 148 and the drive stopped.

The notches 565 represent the zero position of plates 527, finger 528 being adapted to pass through said notches for a zero multiplier setting without initiating a multiplying cycle and allowing the factor carriage to continue shifting to the next lower order.

As shown in Figs. 14 and 15 a laterally extending arm of finger 528 is provided with a projection 567 extending beneath a transverse bail 568, loosely supported upon shaft 516' and secured against lateral movement by suitable spacing collars 569. Upon engagement of finger 528 with a displaced storage member 527 the factor carriage will continue to shift slightly until stopped by engagement of finger 528 with frame plate 514'. This will impart a slight clockwise movement (Fig. 15) to the finger 528, whereupon projection 567 will be raised, imparting clockwise movement (Fig. 14) to bail 568.

Pivotally connected to the right hand end plate of bail 568 is a link 570, the rearward end of which has pivotal connection 571 with an arm 572 fulcrumed at 573 and engaging the arm 594 of latch 148.

Upon operation of bail 568 link 570 will be moved rearwardly, rocking arm 572, and tripping latch 148 from clutch lever 150 of the operating means.

Lever 150 is held inoperative, however, until completion of the platen carriage shift and register setting cycle by means of a lock 341 (Figs. 9 and 11) adapted to drop behind said lever as the latter is restored near the end of the cycle. Lock 341 is released under control of plate 33 of the accumulator control mechanism, the initial operation of plate 33 lifting lock 341 from engagement with projection 342 of clutch lever 150, allowing the clutch lever a limited movement to position under the lock, and against the face of the plate. Upon operation of restoring cam 55 plate 33 will move out of contact with the lever to initiate a multiplying cycle of operation.

PLATEN CARRIAGE SHIFTING MEANS

Reciprocating movement of cam 316 during the preliminary cycle will, through link 162, (Fig. 11) arm 163 and shaft 164, operate the platen carriage releasing means of Fig. 8 in the following manner:

Pivotally mounted at 165 (Fig. 11) upon a bracket 166 secured to the rear casing of the machine, is a bell crank lever 167 (Figs. 9-12) provided with roller 168, held by tension of spring 169 against surface 170 (Fig. 12) of arm 171, loosely secured to a shouldered hub 172 of an arm 173 fast to the shaft 164.

Arm 173 is provided with a pin 174 having engagement with a slot opening 175 of arm 171. During the forward movement of cam 316, said pin is carried downwardly and arm 171 is allowed to fall away from roller 168 to allow lever 167 to be rocked downwardly by spring 169, to the position shown in Fig. 12.

A pin 176 fast to lever 167 has engagement with a lever 177 fast to a short shaft 178 mounted in bracket 166, said pin during movement of lever 167 rocking lever 177 and shaft 178 in a clockwise direction as viewed in Fig. 11.

Secured to the shaft 178 is an arm 179 provided at its free end with a projection 180 (Figs. 8 and 11), adapted during movement of shaft 178 to be moved downwardly into latching engagement with the surface 181 of a spring tensioned latch pawl 182.

Upon return movement of cam 316, link 162 and arm 163 will rock shaft 164 counter-clockwise, as viewed in Fig. 11, and pin 174 of arm 173 will lift the arm 171, causing the surface 170 (Fig. 12) of said arm, contacting roller 168 to rock lever 167 clockwise about point 165; pin 176 through lever 177 rocking shaft 178 counter-clockwise, to move the projection 180 of lever 179 upwardly, whereupon said projection, being in engagement with the surface 181 of latch pawl 182, will lift said pawl bodily.

Pawl 182 is pivotally mounted at 183 upon a trigger 184 secured by pin and slot engagement 185 to bracket 186, fast to the rear frame of the machine.

As pawl 182 is moved upwardly trigger 184 will be carried therewith and spring 187 will rock said trigger to position its projection 188 above the projection 6 of lever 7. This rocking movement of trigger 184 will cause stud 189, fast to said trigger, to disengage the pawl 182 from projection 180 of lever 179, whereupon spring 187 will draw trigger 184 downwardly until stopped by surface 190 contacting a projection 192 of the bracket 186.

Downward movement of trigger 184, however, will cause projection 188 to disengage the projection 6 of lever 7 from the tabulating bar 1 (securing the carriage in tabulated position, as previously described), whereupon the carriage 5 will be free to move until stopped by the projection 6 engaging the notch 2 in the tabulating bar 1 corresponding to the next tabulated position, said engagement effecting operation of the accumulator selecting mechanism as previously described.

During this movement of the carriage, tabulating bar 1 will rock trigger 184, releasing projection 188 from projection 6.

Since the machine makes a multiplying cycle for each digit of the multiplier, certain mechanisms must remain inoperative during the successive multiplying cycles, as follows:

MEANS FOR RENDERING THE PLATEN CARRIAGE SHIFTING MECHANISM INOPERATIVE THROUGHOUT MULTIPLYING CYCLES

Depression of the multiplying key 201 will move link 202 (Fig. 14) rearwardly, arm 404 (Fig. 11), fast to shaft 405 having spring connection 407 with projection 402 of said link being urged in a counter-clockwise direction as viewed in Figs. 11, 12 and in a clockwise direction in Fig. 10.

Fast to shaft 405 is an arm 408 (see also Fig. 9) having pivotally mounted thereon at 409 a spring tensioned latch 410 normally engaged with the shoulder 411 (Fig. 11) of offset projection 412 of arm 171, and thereby preventing movement of shaft 405. As arm 171 is rocked downwardly during the forward stroke of the set up cycle, shoulder 411 will be carried downwardly, out of engagement with latch 410, but projection 412 will now be positioned rearwardly of a projection 413 (Fig. 12) of arm 408, allowing only a slight movement of said arm sufficient to bring the surface 414 of latch 410 into the path of return movement of shoulder 411. Thus, near the end of the return stroke of the set up cycle shoulder 411 will engage surface 414, rocking latch 410 upwardly, and as projection 412 is moved free of projection 413 arm 408 will be rocked by the spring connection with said latch in a counter-clockwise direction (Figs. 12 and 13) sufficiently to bring projection 413 to a position beneath shoulder 411 of offset projection 412. Projection 413 being beneath shoulder 411, arm 171 will be held in raised position during subsequent cycles, thereby rendering the platen carriage shifting mechanism inoperative.

Rocking of shaft 405, near the end of the set up cycle, will also disable the lock 341, so that repeated partial product registrations may be made without tabulation of the platen carriage.

For this purpose arm 404, fast upon shaft 405, as stated, is provided with a lug 490, overlying an arm 491 loosely mounted on said shaft, arm 491 being connected by link 492 with a spring urged latch 493 (Figs. 9 and 13), pivotally mounted upon the frame 29. Latch 493 is designed to move over the left hand end of the intermediately pivoted lock 341. Latch 493 is normally held inactive, against the tension of its spring, by lug 490 and shaft 405, and is released, near the end of the set up cycle, by the rocking of said shaft.

At this time, however, the right hand end of lock 341 has already fallen behind clutch lever 150, so that the left hand end of the lock is raised, into the path of movement of the head of the latch. Upon restoration of lock 341 to normal position, after the shifting of the platen carriage, the lock will be engaged by latch 493 and held inactive during the calculation of the product.

SPLIT PRINTING

Near the end of the forward stroke of the installing cycle, the type hammers 715' will be tripped in the manner previously described, to print the multiplicand and multiplier values simultaneously upon the record sheet.

In this operation the zeros appearing to the right of the multiplicand and multiplier values set on the keyboard will be printed, owing to the provision of the offset lugs 703 (Figs. 6 and 7) of the triggers 701, which each underlie the trigger of next lower order so that displacement of the higher order triggers will likewise displace all the lower order triggers.

There is, of course, no lug 703 immediately to the right of the units order multiplicand trigger, but, since in normal addition and subtraction and in the printing of products all the type hammers are used, special means must be provided to prevent the printing of zeros to the left of the multiplier, which would merge the multiplicand with the multiplier.

Fast to a shaft 329, having link connection 330 (Fig. 14) with link 202, is an arm 331 (Figs. 6 and 7) engageable with one arm of a latch 332 forming a special connection designed to replace the lug 703 between the units order multiplicand trigger and the highest order multiplier trigger. In the normal position of the parts latch 332, which is secured upon the units order multiplicand trigger, underlies a laterally bent lug 333 of the highest order multiplier trigger, to operate the latter in the same manner as lug 703 of the other triggers. Upon depression of multiplying key 201, however, link 202 in moving rearwardly will rock shaft 329 counter-clockwise, whereupon latch 332 will be displaced from beneath lug 333, as shown in Fig. 6, so that the tripping of the triggers to the left will not trip the triggers to the right of said column.

NON-PRINTING CONTROL MEANS

The following means are adapted to prevent printing during the multiplying cycles:

Pivotally mounted upon the framing at 432 is a bail 434 (Fig. 10) having link connection 435 with lever 408, and as said lever is rocked clockwise during the return stroke of the set up cycle bail 434 will be rocked downwardly, into engagement with a hook end 436 of bail 707 extending transversely of and lying in the path of movement of the type hammers 715', thereby preventing operation of said hammers.

MEANS FOR HOLDING OUT COLUMN LATCHES THROUGHOUT MULTIPLYING CYCLES

Means must be provided for clearing the keyboard at the conclusion of the preliminary setting and printing cycle, and for holding the column latches 214 released throughout the multiplying cycles. This is accomplished as follows:

Pivotally secured at 574 (Fig. 14) to the right hand framing of the machine is a spring tensioned latch 575, normally held in forward position out of cooperation with the pin 263 of rocker 227 by the projection 576 of link 202. During rearward movement of link 202 upon depression of key 201, projection 576 moving rearwardly will allow latch 575 to be rocked until stopped by pin 263.

Near the end of the set up cycle arm 163 (Fig. 11) will move rocker 227 in the manner previously described, lifting latches 214 (Fig. 6) and moving slides 191 to release the keys 215, whereupon pin 263 will engage latch 575, holding rocker 227 in rocked position and the latches 214 free of the stop bars 615.

MEANS FOR UNLOCKING THE MECHANISM CONTROLLING UNITS PARTIAL PRODUCT REGISTRATION

As previously stated the segments 505' (Figs. 6 and 20) of the differential mechanisms are normally prevented from operating by the universal bail 628. These segments are released at the end of the set up cycle in the following manner:

Upon depression of key 201 clockwise movement of lever 558 (Fig. 14) will bring a projection 577 of said lever beneath the surface 578 of a spring tensioned latch 579, pivotally mounted upon the right hand end plate of transverse bail 628 (Fig. 20). Latch 579 is normally held away from projection 577 by a cam surface 580 of the link 556, but said link in moving downwardly upon depression of key 201 will release latch 579 whereupon said latch, under influence of its spring 581, will engage projection 577.

Near the end of the set up cycle of operation lever 558 will be rocked, and projection 577 engaging surface 578 will lift latch 579, rocking bail 628 counter-clockwise (Fig. 20) about its fulcrum point 582, unlocking the units leg 505' of the differentials.

The units legs 505' of the differentials will be held at this time by means of the bail 507' under control of the rock frame 616'.

Universal bail 628 will be held in rocked position throughout the multiplying cycles of operation by means of a spring tensioned latch 583 pivotally supported upon the shaft 208.

MULTIPLYING CYCLES

Registration of the partial products

Since in multiplication units of partial products are registered subtractively, while the tens are registered additively, a unique condition is created whereby normal registrations—that is, any registrations taken directly from the keys 215 instead of from the partial product disks 511'—should be made through the segments 500', which in multiplication register the tens values of partial products, as sensed by the feelers 530'. Consequently, the segments 505' which register units partial product values in multiplication never operate except in multiplication, and in operating, pick up the units values from the partial product plates which are positioned in the next higher order. In other words, the partial product plates are positioned in line with the orders in which the tens values are to be registered, so the extreme right shifted position of the factor carriage places the lowest order partial product disks into the zone of the tens column of multiplier keys.

To more easily follow the multiplying operation we will assume the factors of the previous example to have been set up on keys 215 and subsequently stored upon the multiplicand disks 511', multiplier plates 527, and printed upon the record sheet during the set up cycle:

```
      0005400 — Multiplicand
        00703 — Multiplier
```

The parts having been adjusted and the factor carriage released at the end of the set up cycle, said carriage will be drawn toward the right, under influence of spring 566, until stopped by engagement of finger 528 with the seventh stop 545a (Fig. 15) of the plate 527 in the hundreds order. This will position the carriage with all of the partial product plates 511' for the multiplier digit 7 in zone with the feelers 529', 530'.

Since the plates in the thousands order were adjusted five steps in a counter-clockwise direction, corresponding to the multiplicand digit 5, the plates in the hundreds order four steps, corresponding to the digit 4 while the plates in all other orders remain in zero position, the index surfaces of the tens portions of all of the plates 511' for the multiplier 7 and the index surfaces of the units portions of said disks will cooperate with their related feelers 529', 530' to limit the movement of said feelers for registration according to the partial product values of Fig. 4.

As previously described, the engagement of locating finger 528 with a plate 527 will rock bail 568 (Fig. 14), tripping the main clutch for one machine cycle. During this cycle the partial products for the whole multiplicand by the multiplier digit 7 will be registered, the difference between the movement of a units feeler in one order and the tens feeler of the next lower order being transmitted through the related gears 502' to the floating segments 610' and registered on the accumulator wheels.

As in the example previously described, since all of the zero stops 214 are held free of stop bars 615 and there are more feeler levers than there are sets of partial product plates in the carriage, the feelers beyond the carriage range must be appropriately controlled. Projection 588' (Figs. 6, 15 and 16) provided on the left end frame 515' of the carriage, will prevent movement of the units feeler adjacent to the left of the carriage, and projection 589' provided on the right end frame 514' will prevent movement of the next adjacent tens feeler to the right of the carriage, while all the rest of the feelers beyond the range of the carriage will be free to move the full extent of their movement of nine steps, the plus and minus movements cancelling out.

The partial product values of the multiplier 7 having been registered upon the accumulator, the factor carriage is again released near the end of the cycle, by the operation of lever 558, and is shifted toward the right until stopped by engagement of finger 528 with the surface 545a of the third step of plate 527 in the units multiplier order; the finger 528 having passed through the notch 565 of the plate 527' for the naught multiplier of the tens order. Engagement of finger 528 with the units order plate will again rock bail 568, to start another cycle, wherein all of the partial product plates 511' for the multiplier digit 3 will cooperate with feelers 529', 530' to register the tens and units partial products for the units order multiplier, said partial products being accumulated with the previous registrations to comprise the total product.

At the completion of the multiplying cycle for the units order multiplier the factor carriage is again released and will shift a further short step to its extreme right hand position, during which movement a cam projection 590 (Figs. 14 and 15) of the right end plate 514' of the carriage will engage a projection 591 of latch lever 508, releasing the depressed multiplying key 201, said key being restored under influence of its spring 592.

Restoration of multiplying key 201 moves slide 202 (Fig. 14) forwardly, restoring shaft 405, together with shaft 329 and arm 331 (Figs. 6 and 14) of the split clearout mechanism, and latch 332 (Fig. 6) having reengaged projection 333 of trigger 701, a full capacity tripping of hammers 715' is provided, to print zeros to the right of the significant digits of the product. The nonprint bail 434 (Fig. 12) will be restored to inactive position in the restoration of shaft 405, which will also free member 171 for normal tabulator tripping action.

Restoration of slide 202 will also have released latch 575 (Fig. 14) from pin 263 of bail 227 controlling the key and zero latch release, the slide 202 moving forwardly in slot 593 of trigger 509. Trigger 509 is held rearwardly by engagement with the surface 594 of latch 148 until operation of said latch by the rod 130 (Fig. 13) above described, whereupon trigger 509 is restored to normal under influence of its spring 595.

Since the printing type is connected to the tens segments 500' of the differentials, restoration of the multiplying key 201 must provide for again locking the units legs 505' of the differentials before the starting of the total taking cycle, as follows:

Link 556 (Figs. 14 and 20) is provided with a projection 597 adapted during the upward movement of said link, as key 201 is restored, to release latch 583 from the arm 598 of the universal bail 628, and latch 579 of said bail having been moved free of projection 577 of lever 558 by the surface 580 of link 556, universal bail 628 will again, under influence of its spring 581, come into the path of movement of the arms 585' of units feelers 529', locking the units legs of the differentials. Feelers 529', links 584' and segments 505' have been restored to normal position through restoring bails 507', operated by the rock frame 616' as previously described.

During restoration of key 201 link 556, through pin and slot connection 557, will restore lever 558, rocking locating finger 528 to normal position forward of multiplier plates 527.

The above noted movement of the factor carriage also trips the return clutch thereof and tabulates the platen carriage 5 as hereinafter described.

MEANS FOR RESTORING THE FACTOR CARRIAGE

Fast to the frame 514', 515' of the factor carriage is a toothed rack 433 (Figs. 10 and 16) having gear connection 437 with a rotary member provided with a link 439 pivotally connected at 440 to a rocker 441, fulcrumed at 442 to a stud in the bottom framing of the machine. As the factor carriage is shifted toward the right rocker 441 will be rocked in a clockwise direction as viewed in Fig. 16.

Rocker 441 is provided with a projection 443 adapted to engage a projection 444 of a latch 445, pivotally mounted upon the framing at 446, this engagement occurring as the carriage completes its movement toward the right. Latch 445 has engagement through projection 447 with a spring tensioned arm 448.

Clockwise movement of rocker 441 will rock latch 445 in a clockwise direction, thereby moving projection 447 out of engagement with arm 448, whereupon said arm, under influence of spring 449, will be rocked counter-clockwise about its fulcrum 450. Fast to arm 448 is an insulated roller 451, having engagement with a clutch lever 452 also pivotally mounted upon the bottom frame at 450. Counter-clockwise movement of arm 448 will thus rock clutch lever 452 counter-clockwise to effect engagement of a one cycle clutch 453, driven through drive shaft 47. The driven element of clutch 453 has beveled gear connection 454 with a beveled gear 455, mounted upon a stud 456 fixed in bracket 458 fast to the bottom framing of the machine.

Insulated roller 451 of arm 448 is adapted to engage the contacts of a subsidiary switch 459 in a parallel circuit through electric motor 48, by means of which gear 455 will be driven in a clockwise direction.

During clockwise movement of gear 455 a roller 460 mounted thereon will trip a pawl 461 having connection by means of a Bowden cable 462 with a spring tensioned trigger 463 (Fig. 11) provided with an extension 464 underlying a projection 465 of the platen carriage positioning lever 7 (Fig. 8). Tripping of pawl 461 will rock lever 7 to release projection 6 from bar 1, whereupon the carriage 5 will be tabulated to a third position. The carriage in moving to this position is now properly located for the printing of the product, the program mechanism previously described setting the product accumulator for total taking and optionally setting one or more other accumulators to receive the product, in accordance with the well known method of transferring a total.

Upon restoration of key 201 the slide 535 (Figs. 6 and 15) is moved to normal rearward position, wherein the cam projection 534 will lie in the path of movement of latch 532. As the factor carriage is returned to its normal left hand position latch 532 engaging projection 534 will be rocked out of engagement with projection 533 of locking bail 526. Also, upon return of the factor carriage to normal position, arm 548 (Fig. 10) will be returned to a position in rear of projection 549 of latch 547, so that as shaft 531 is rocked in the releasing movement of latch 532 (Fig. 6) arm 548 (Fig. 10) will release latch 547 from projection 524 of slide 522 to thereby release locking bails 519 and 526.

Upon release, bails 519 and 526, under influence of a spring 596 (Fig. 6) will be moved out of engagement with the plates 512' of the multiplicand storage units and the multiplier stepped plates 527, whereupon said members under influence of their related springs are restored to zero position.

Continued clockwise rotation of gear 455 will cause roller 460 (Fig. 16) to engage the surface 466 of the operated rocker 441, restoring said rocker to normal position and through link 439, gearing 437 and rack 433 restoring the factor carriage to its left hand position. Near the end of the clockwise movement of gear 455 roller 460 will engage a bell crank lever 467, fulcrumed at 468, rocking said bell crank counter-clockwise, whereupon roller 469, mounted thereon, will engage surface 470 of arm 448, restoring said arm to normal latched position and releasing switch 459 and clutch lever 452, whereupon lever 452 will act to disengage clutch 453 as said clutch moves to full cycle position.

AUTOMATIC TOTAL MEANS

The product will be printed by an automatically initiated totaling operation as follows:

Pivotally mounted at 471 (Fig. 16) upon bell crank 467 is a lever 472 connected by means of spring coupling 475 with a bell crank lever 476 (Fig. 13) fulcrumed at 477 upon the right end framing of the machine. Bell crank 476 has link connection 478 with the total key 278'. During the counter-clockwise movement of bell crank 467, lever 472 will be carried therewith and projection 479 of said lever will engage a projection 480 of the restored rocker 441 and will fulcrum thereon to move spring coupling 475 in the direction indicated by the arrow, rocking bell crank 476 counter-clockwise and depressing the total key 278' to thereby release total segment 618 (Fig. 13) and effect the zeroizing of the product accumulator in the manner previously described. The reduction gearing 454, 455 (Fig. 16) is designed to allow sufficient time to insure the completion of the accumulator selection before depression of the total key.

During operation of total segment 618 pin 481 will depress rod 130 releasing latch 148 from clutch lever 150 to initiate a total printing cycle.

During the total printing cycle, the projection 6 (Fig. 8) of lever 7 will be released from bar 1, as in the factor printing cycle, bar 1 being designed to allow movement of the platen carriage to the extreme left at this time.

A cam shoe 196 mounted upon a transverse bar 195 of the platen carriage 5 is adapted by co-operating with a roller 197, fast to an arm 198 secured to square shaft 199, to rock said shaft and thereby operate suitable clutch controlled means for returning said carriage to its initial position, as fully described in United States Patent No. 1,946,572.

THE MULTIPLICATION PROGRAM

In order that the entire multiplication program may be clearly followed, the following list of successive machine functions is given, the indented lines indicating dependence of action:

Multiplicand and multiplier set in keyboard.
Platen carriage brought to right hand position.
    Accumulator setting clutch engaged.
Accumulators set for non-add.
Key 201 depressed.
    Split printer set.
    Main clutch engaged.
Machine cycles to print factors.
    Values locked in multiplicand and multiplier storage members.
    Digit keys and column latches released.
    Units segments released.
    Factor carriage released and located.
    Platen carriage tabulator tripped.
    Non-print mechanism set.
    Tabulator trip disabled.
    One cycle lock disabling means set.
Platen carriage tabulated to second position.
    Accumulator setting clutch engaged.
Product accumulator set for operation.
    One cycle lock disabled.
    Main clutch engaged.
Machine cycles to register partial product.
(Factor carriage release, tripping of main clutch and cycling, repeated for each multiplier digit.)
    Final release of factor carriage.
Factor carriage to extreme right.
    Key 201 released.
        Split printer disabled.
        Units segments relocked.
        Non-printer disabled.
        Tabulator trip reenabled.
        One cycle lock reenabled.
        Column latches reengaged.
    Factor carriage return clutch engaged.

Factor carriage returned toward left.
  Platen carriage tabulator tripped.
Platen carriage tabulated to third position. ⎫
  Accumulator setting clutch engaged. ⎬ Completed during factor carriage return.
Product accumulator set for total, others for transfer. ⎭
    Storage members zeroized.
    Total key depressed.
      Column latches released.
  Total segment zeroizes product accumulator.
    Main clutch engaged.
Machine cycles to print product, etc.
    Total key released.
      Column latches reengaged.
      Platen carriage tabulator tripped.
  Platen carriage to extreme left.
    Platen carriage return clutch engaged.
Platen carriage restored to initial position.

I claim:

1. In a calculating machine having an accumulator comprising denominational wheels; partial product plates having tens index faces and units index faces representing the tens and the complement of the units partial product values, value entering means adjustable to determine movement of said plates to bring given index faces into controlling position, actuating means comprising a series of differential gear units having each a reversible output gear in driving connection with a wheel of said accumulator, and two input gears, means operable to effect concomitant movements of invariably opposite registering sign in each input gear pair, and to merge said movements in the output gear and feelers individual to and movable by the input gears into contact with the controlling tens and units index faces whereby the difference between the values represented by said faces is registered on the accumulator.

2. In a calculating machine having an accumulator and differential actuators therefor; a carriage denominationally shiftable relative to the actuators, partial product devices mounted thereon comprising series of settable plates each plate representing the product values related to a single multiplier digit and two fixed plates representing a product value of zero, means operable to set the settable plates in accordance with a multiplicand value, multiplier value entering means operable to locate the carriage in denominationally shifted position with the partial product plates of a given multiplier digit value in position to cooperate with the actuators, and units and tens feelers concomitantly movable by the actuators into contact with the partial product plates to differentially limit the actuator movement in accordance with the units and tens values of the partial products, respectively, said fixed zero plates extending laterally a distance equal to the lateral extent of a series of adjustable plates and being movable with the carriage, one into the path of movement of the units feeler of the actuator associated with the highest order series of settable plates and the other into the path of movement of the tens feeler of the actuator associated with the lowest order series of settable plates.

3. In a calculating machine having an accumulator comprising denominational wheels; partial product plates mounted for shiftable movement relative to said accumulator and having tens index faces and units index faces, value entering means adjustable to determine movement of said plates to bring given index faces into controlling position, actuating means comprising a series of differential gear units mounted in fixed relation to said accumulator, each unit having a reversibly operable output leg in driving connection with a wheel of said accumulator, and two input legs normally latched against operation, means operable to release each input leg pair and to effect therein movements of invariably opposite registering sign, feelers individual to and movable by the input leg gears into contact with the controlling tens and units index faces of the related partial product plates, and stops designed to limit the two input legs of each differential to a maximum registering movement of equal value, whereby released actuators, out of shifted relation with the partial product plates, will effect offsetting movements of the input legs and no movement of the output legs.

4. In a calculating machine having an accumulator comprising denominational wheels; partial product plates having tens index faces and units index faces representing the tens and the complement of the units partial product values, value entering means adjustable to determine movement of said plates to bring given index faces into controlling position, actuating means comprising a series of differential gear units having each a reversibly operable output gear in driving connection with a wheel of said accumulator, and two input gears, means operable to effect movements of invariably opposite registering sign in each input gear pair, feelers individual to and movable by the input gears into contact with the controlling tens and units index faces, locks for the units input feelers and gears of the differential units, and means operable to release said locks and to initiate a product calculation.

5. In a listing calculating machine having an accumulator comprising denominational wheels; partial product plates having tens index faces and units index faces representing the tens and the complement of the units partial product values, factor value entering means adjustable to determine movement of said plates to bring given index faces into controlling position, actuating means comprising a series of differential gear units having each a reversibly operable output gear in driving connection with a wheel of said accumulator, and two input gears, means operable to effect movements of invariably opposite registering sign in each input gear pair, feelers individual to and movable by the input gears into contact with the controlling tens and units index faces, locks for the units input feelers and gears of the differential units, and multiplication control means and sequentially operable means controlled thereby and comprising elements operable to effect listing of the entered factors, elements operable to release said locks and elements operable to initiate a product calculation.

6. In a listing calculating machine having an accumulator comprising denominational wheels; partial product plates having tens index faces and units index faces representing the tens and the complement of the units partial product values, factor value entering means adjustable to determine movement of said plates to bring given index faces into controlling position, actuating means comprising a series of differential gear units having each a reversibly operable output gear in driving connection with a wheel of said accumulator, and two input gears, means operable to effect movements of invariably opposite registering sign in each input gear pair, feelers individual to and movable by the input gears into contact with the controlling tens and units index faces, locks for the units input feelers and gears of the differential units, multiplication control means and sequentially operable means controlled thereby and comprising elements operable to effect listing of the entered factors, elements operable to release said locks, elements operable to initiate a product calculation, elements operable to reengage the locks and elements operable to list the product.

7. In a calculating machine having an accumulator; a carriage shiftable relative to said accumulator, settable partial product plates mounted on said carriage and having tens index faces and units index faces representing the tens and the complement of the units partial product values, differential actuators each including a pair of elements one for effecting additive operation and the other for effecting subtractive operation of the accumulator and further each including a tens and a units feeler for controlling said elements, said feelers having paths of movement normally out of register with the partial product plates, means normally serving to disable one actuator element of each pair, means operable to move the disabling means to inactive position, means to bring the partial product plates into the paths of movement of the feelers, and two fixed stops on said carriage representing each a product value of zero and located respectively in the path of the units feeler associated with the highest order partial product plate and in the path of the tens feeler associated with the lowest order partial product plate.

8. In a calculating machine having an accumulator and differential actuators therefor; partial product plates denominationally shiftable relatively to the actuators and comprising series of elements each element having stop faces representing the digital and zero values of the units and of the tens product values related to a given multiplier digit, setting elements movable with said actuators to set said plates in accordance with multiplicand value, multiplier value entering means designed to provide for a relative denominational shift between said plates and the actuators and to arrest the denominational shifting movement of the parts with the partial product plates of a given multiplier digit value in operative position relative to the actuators, and pairs of normally ineffective feeler elements movable with the actuators concomitantly into contact with the units and the tens stop faces respectively of the shifted partial product plates to differentially limit the actuator movement.

9. In a calculating machine having an accumulator and differential actuators therefor; partial product plates denominationally shiftable relatively to the actuators and comprising spaced series of elements each representing the units and the tens product values related to a given multiplier digit, elements movable with said actuators to set said plates in accordance with multiplicand values, pairs of feelers normally lying opposite the spaces between the partial product series and concomitantly movable with the actuators, and multiplier value entering means designed to provide for a relative denominational shift between said plates and the actuators to move said plates out of cooperating relation with the multiplicand setting elements, and to arrest the denominational shifting movement of the parts with the units and the tens portions of each partial product plate of a given multiplier value opposite a pair of feelers to provide for differential limitation of the actuator movement.

10. In a calculating machine having an accumulator and differential actuators therefor; a carriage denominationally shiftable relative to the actuators, partial product devices mounted thereon comprising series of settable plates each plate representing the product values related to a single multiplier digit, and fixed plates representing a product value of zero, located beyond the extreme higher and lower order settable plates and extending laterally a distance equal to the lateral extent of a series of adjustable plates representing the values related to the multiplier digits one to nine, means operable to set the settable plates in accordance with a multiplicand value, multiplier value entering means operable to locate the carriage in denominationally shifted position with the partial product plates of a given multiplier digit value in position to cooperate with the actuators, and elements movable with the actuators into contact with the partial product plates to differentially limit the actuator movement.

GEORGE C. CHASE.

CERTIFICATE OF CORRECTION.

Patent No. 2,342,529. February 22, 1944.

GEORGE C. CHASE.

It is hereby certified that error appears in the printed specification of the above numbered patent requiring correction as follows: Page 4, first column, line 34, for "lugs" read --legs--; page 13, first column, line 47, claim 8, for "value" first occurrence, read --values--; and that the said Letters Patent should be read with this correction therein that the same may conform to the record of the case in the Patent Office.

Signed and sealed this 25th day of July, A. D. 1944.

Leslie Frazer (Seal) Acting Commissioner of Patents.